(12) United States Patent
Broadbent et al.

(10) Patent No.: US 9,869,563 B2
(45) Date of Patent: Jan. 16, 2018

(54) METHOD AND APPARATUS FOR PREDICTING A DESTINATION USING A ROUTE SEARCH ALGORITHM

(71) Applicant: TomTom Navigation B.V., Amsterdam (NL)

(72) Inventors: Samuel Mark Broadbent, Amsterdam (NL); Pieter Andreas Geelen, Amsterdam (NL); Stéphane Hareau, Amsterdam (NL); Jose F. Santiago Nunez, Amsterdam (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 14/785,406

(22) PCT Filed: Apr. 17, 2014

(86) PCT No.: PCT/EP2014/057893
§ 371 (c)(1),
(2) Date: Oct. 19, 2015

(87) PCT Pub. No.: WO2014/170434
PCT Pub. Date: Oct. 23, 2014

(65) Prior Publication Data
US 2016/0097649 A1   Apr. 7, 2016

Related U.S. Application Data

(60) Provisional application No. 61/813,157, filed on Apr. 17, 2013.

(51) Int. Cl.
*G01C 21/34* (2006.01)
*G01C 21/36* (2006.01)
*G08G 1/0968* (2006.01)

(52) U.S. Cl.
CPC ..... *G01C 21/3453* (2013.01); *G01C 21/3415* (2013.01); *G01C 21/3476* (2013.01);
(Continued)

(58) Field of Classification Search
CPC ............ G01C 21/3415; G01C 21/3476; G01C 21/3667; G01C 21/3691; G01C 21/3697;
(Continued)

(56) References Cited

U.S. PATENT DOCUMENTS 5,928,307 A   7/1999   Oshizawa et al.
6,266,608 B1  6/2001   Pertz
(Continued)

FOREIGN PATENT DOCUMENTS

CN   101395444 A   3/2009
EP   0829837 A1    3/1998
(Continued)

OTHER PUBLICATIONS

International Search Report of International Application No. PCT/EP2014/057893 dated Jul. 25, 2014.
(Continued)

*Primary Examiner* — Michael D Lang

(57) ABSTRACT

A method of predicting a destination of a user of a mobile device is described, together with a device for performing the same. The method comprises determining a location of the mobile device, and executing a route search algorithm with respect to a trip data-base. The trip database stores information indicative of a personal road network of a user of the mobile device, one or more road segments in the personal road network being associated with a respective destination location, and cost information associated with road segments in the personal network, the cost information being based, at least in part, on traversal information in the trip database.

17 Claims, 12 Drawing Sheets

(52) U.S. Cl.
CPC ..... *G01C 21/3667* (2013.01); *G01C 21/3691* (2013.01); *G01C 21/3694* (2013.01); *G01C 21/3697* (2013.01); *G08G 1/096827* (2013.01); *G08G 1/096838* (2013.01); *G01C 21/3484* (2013.01); *G01C 21/3617* (2013.01)

(58) Field of Classification Search
CPC ............ G01C 21/3617; G01C 21/3484; G08G 1/096827
See application file for complete search history.

(56) References Cited

U.S. PATENT DOCUMENTS

| | | | |
|---|---|---|---|
| 6,680,674 | B1 | 1/2004 | Park |
| 6,865,480 | B2 | 3/2005 | Wong |
| 7,609,172 | B2 | 10/2009 | Rozum et al. |
| 7,630,828 | B2 | 12/2009 | Tajima et al. |
| 7,835,859 | B2 | 11/2010 | Bill |
| 7,908,080 | B2 | 3/2011 | Rowley et al. |
| 8,073,615 | B2 | 12/2011 | Kudoh et al. |
| 8,126,641 | B2 | 2/2012 | Horvitz |
| 8,175,802 | B2 | 5/2012 | Forstall et al. |
| 9,080,873 | B2 | 7/2015 | Basson et al. |
| 2004/0204845 | A1 | 10/2004 | Wong |
| 2006/0149461 | A1 | 7/2006 | Rowley et al. |
| 2007/0010942 | A1* | 1/2007 | Bill .................. G01C 21/3679 701/424 |
| 2008/0004802 | A1 | 1/2008 | Horvitz |
| 2008/0088480 | A1 | 4/2008 | Rozum et al. |
| 2009/0005965 | A1 | 1/2009 | Forstall et al. |
| 2009/0088962 | A1* | 4/2009 | Jones .................. G06F 17/3087 701/519 |
| 2009/0105934 | A1 | 4/2009 | Tajima et al. |
| 2009/0319176 | A1 | 12/2009 | Kudoh et al. |
| 2010/0138146 | A1 | 6/2010 | Vogt et al. |
| 2011/0029549 | A1 | 2/2011 | Pandya |

FOREIGN PATENT DOCUMENTS

| | | |
|---|---|---|
| EP | 0854463 A2 | 7/1998 |
| EP | 1640936 A1 | 3/2006 |
| JP | 2005283575 A | 10/2005 |
| WO | 2007067842 A2 | 6/2007 |
| WO | 2009143876 A1 | 12/2009 |
| WO | 2010040385 A1 | 4/2010 |
| WO | 2012034581 A1 | 3/2012 |
| WO | 2012127816 A2 | 9/2012 |

OTHER PUBLICATIONS

International Search Report of International Application No. PCT/EP2014/057898 dated Jul. 23, 2014.
International Search Report of International Application No. PCT/EP2014/057911 dated Jul. 25, 2014.
International Search Report of International Application No. PCT/EP2014/057922 dated Jul. 24, 2015.

* cited by examiner

METHOD AND APPARATUS FOR PREDICTING A DESTINATION USING A ROUTE SEARCH ALGORITHM

CROSS-REFERENCE TO RELATED APPLICATIONS

The present application is a National Stage of International Application No. PCT/EP2014/057893, filed Apr. 17, 2014 and designating the United States, which claims benefit to U.S. Provisional Patent Application Serial No. 61/813,157 filed on Apr. 17, 2013. The entire content of these applications are incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GNSS (global navigation satellite systems), such as GPS, signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user, such as a commuter, already knows the route along which it is desired to travel and does not require navigation assistance.

It has been observed that users travelling familiar routes may not utilise a navigation device, already knowing route. Whilst the user does not need turn-by-turn guidance they also do not receive the benefit of information which the navigation device may be capable of providing. It is an aim of some embodiments of the invention to provide information to a user of a mobile device without the user being required to enter details of their journey into the mobile device.

SUMMARY OF THE INVENTION

According to a first aspect of the present invention there is provided a mobile device, comprising a processor communicably coupled to a trip database storing information indicative of a personal road network of a user of the mobile device, one or more road segments in the personal road network being associated with a respective destination location, wherein the processor is arranged to operably execute a prediction module to predict a destination based on a current location of the mobile device and the trip database, and wherein the prediction module is arranged to predict the destination by executing a route search algorithm with respect to the personal road network and cost information associated with road segments in the personal network, the cost information being based, at least in part, on traversal information in the trip database.

The traversal information may be indicative of a number of times each road segment in the personal network has been traversed by the user. The personal network of the user may comprise a plurality of road segments previously traversed by the user of the mobile device in one or more journeys.

The prediction module may be arranged to select a road segment from the personal network based on the current location of the mobile device and to perform the route search using the road segment as a start location. The road segment selected as the start location may have a location corresponding to, or within a predetermined distance of, the current location.

The prediction module may be arranged to predict the destination based on a current time and time information stored in the trip database indicative of a time of traversal of associated road segments in the personal network. The prediction module may be arranged to perform the route search using the road segment as the start location when the current time corresponds to the time information. The time information may indicate one of a plurality of periods of time during which the road segment was traversed, and the current time may correspond to the time information when matching, or within a predetermined number of time periods of, the current time.

The processor may be communicably coupled to a favourites database storing information indicative of one or more points of interest (POIs) selected by the user. The one or more road segments in the personal network associated with a destination location may be associated with POIs in the favourites database.

The prediction module may be arranged to provide the predicted destination to the user for selection as a destination of a current journey. The prediction module may be arranged to predict one or more further, less likely, destinations.

In embodiments, the mobile device comprises a display device, wherein the prediction module is arranged to provide a suggested destination interface comprising the predicted destination.

According to another aspect of the present invention, there is provided a method of predicting a destination of a user of a mobile device, comprising:

determining a location of the mobile device; and executing a route search algorithm with respect to a trip database storing information indicative of a personal road network of a user of the mobile device, one or more road segments in the personal road network being associated with a respective destination location, and cost information associated with road segments in the personal network, the cost information being based, at least in part, on traversal information in the trip database.

The predicted destination may be a destination location associated with a road segment found by the route search algorithm.

The method may comprise selecting a road segment from the personal network based on the location of the mobile device and performing the route search using the road segment as a start location. The road segment selected as the start location may have a location corresponding to, or within a predetermined distance of, the current location.

The method may comprise predicting the destination based on a current time and time information stored in the trip database indicative of a time of traversal of associated road segments in the personal network. The step of performing the route search may use the road segment as the start location when the current time corresponds to the time information. The time information may indicate one of a plurality of periods of time during which the road segment was traversed, and the current time corresponds to the time information when matching, or within a predetermined number of time periods of the current time.

The method may comprise providing the predicted destination to the user for selection as a destination of a current journey.

In embodiments, one or more road segments in the personal network associated with a destination location may be associated with user-selected points of interest (POIs) stored in a favourites database.

The steps of the method of the present invention in any of its aspects or embodiments may be carried out in part by a server and in part by a mobile device. The steps of the method may be performed exclusively on a server, or some on a server and the others on a mobile device in any combination, or exclusively on a mobile device. The mobile device may be a navigation device, e.g. a personal navigation device (PND) or an integrated, e.g. in-vehicle, device.

Any of the methods in accordance with the present invention may be implemented at least partially using software, e.g. computer programs. In other words, the present invention is preferably a computer implemented invention, and any of the steps described in relation to any of the aspects or embodiments of the invention may be carried out under the control of a set of one or more processors.

The present invention thus also extends to a computer program comprising computer readable instructions executable to perform, or to cause a device, e.g. mobile device and/or server, to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Thus, in another aspect of the present invention, there is provided computer software operable, when executed on a device, such as a mobile device or a server, to cause one or more processors to perform a method as described above. The computer software may be stored on a non-transitory computer-readable medium.

BRIEF DESCRIPTION OF THE DRAWINGS

Various embodiments of the present invention will now be described with reference to the accompanying drawings, in which:

FIG. 17 is an illustration of an incident list according to an embodiment of the invention;

FIG. 18 is an illustration of first and second incident lists according to an embodiment of the invention.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute software so as to provide, for example, route planning and/or navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA) executing route planning and navigation software.

In some embodiments of the invention the navigation device is a mobile device which is intended for use by commuters and other "regular travellers", i.e. those who frequently travel one or more routes to the same destinations. The mobile device therefore aims to provide personal traffic and travel information. Personal traffic and travel information is intended to mean relevant to the user. Such traffic and travel information may be provided to the user without the user necessarily having entered a specific destination into the device, as would be expected by a user travelling to a frequent destination such as their place of work. The mobile device may not provide turn-by-turn voice guidance since it would be expected that the user already knows the route that they intend to travel. However the device may provide visual prompts to the user regarding the route ahead and relevant traffic and/or travel information. These visual prompts may be schematically illustrated to provide the user with a simple-to-view illustration of the road network. In some embodiments the user is able to enter a destination from a plurality of destination pre-set by the user, or to confirm a likely destination suggested by the mobile device.

Figure 1:
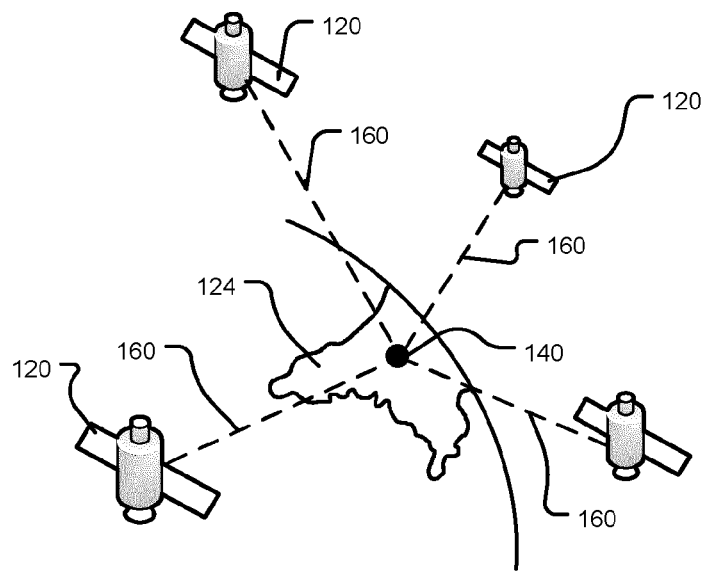
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
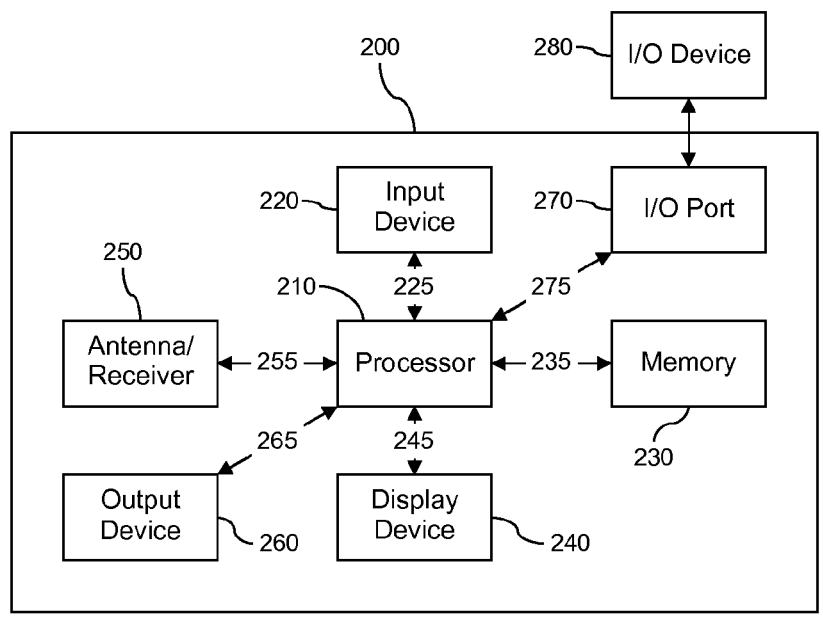
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto.

Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
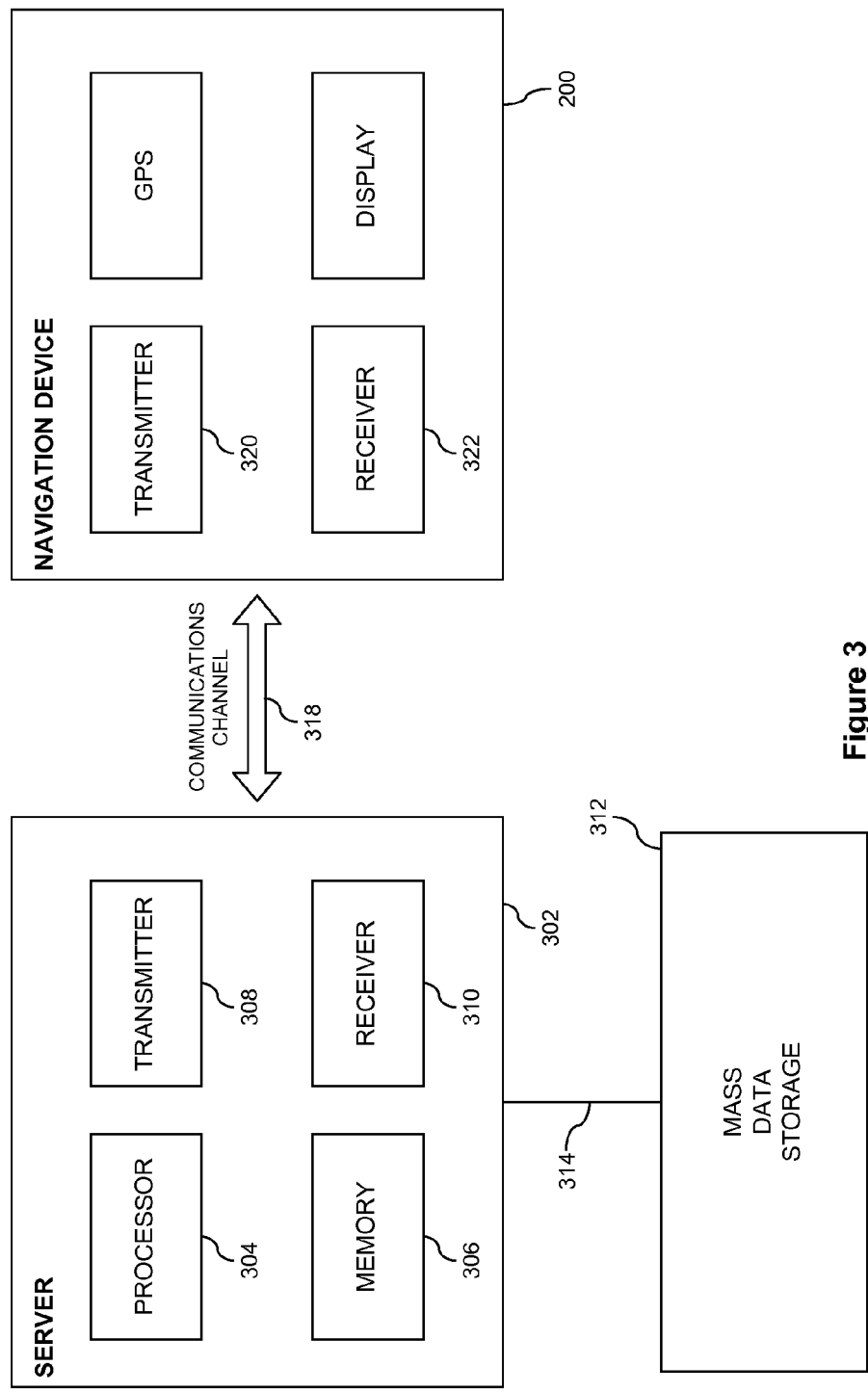
FIG. 3 is a schematic illustration of the manner in which a navigation device may receive information over a wireless communication channel.
Figure 4:
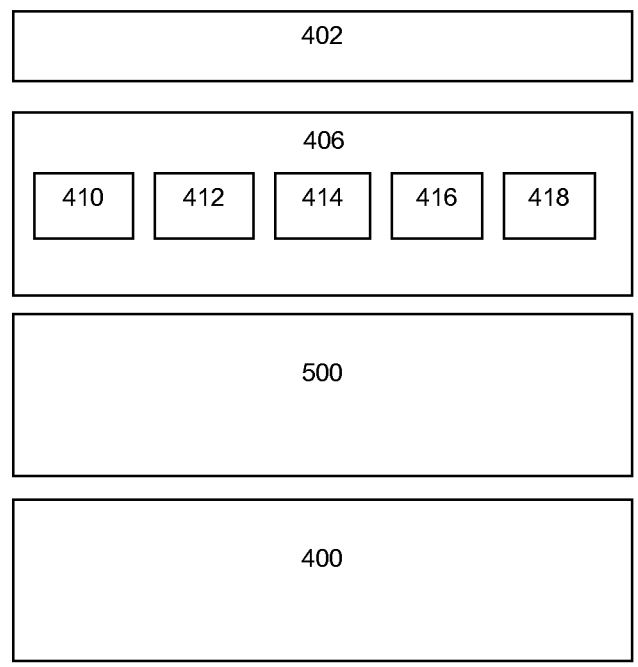
FIG. 4 shows a preferred embodiment of a software stack on a preferred mobile navigation device.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

The mobile, e.g. navigation, device 200 may comprise one or more software modules, executable on an application framework, the functions of which are described in more detail below. It will be appreciated that some embodiments may comprise only a single one of the modules, whereas other embodiments may comprise two or more or all of the modules.

Figure 5:
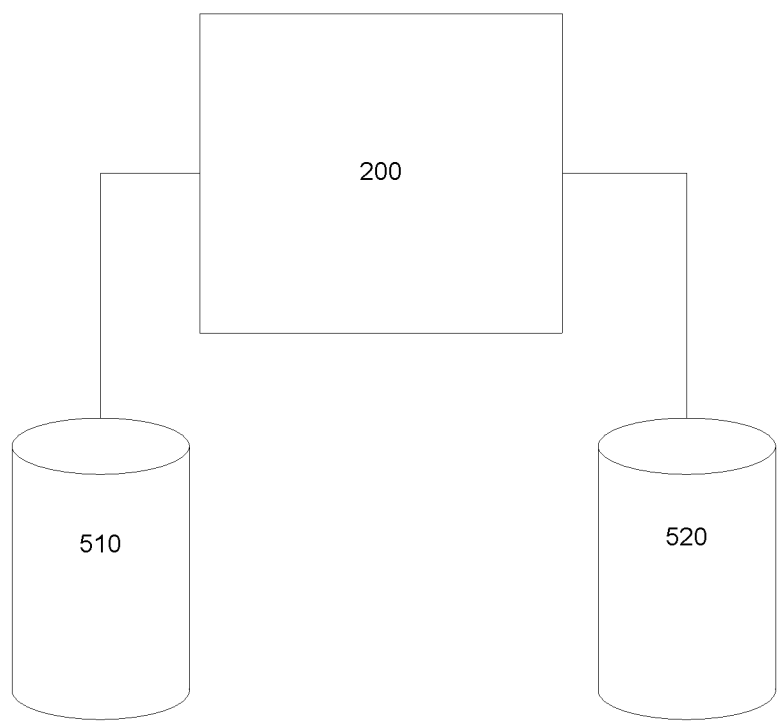
FIG. 5 is a schematic illustration of an apparatus according to an embodiment of the invention.

One of the software modules comprises a trip recording module which operatively stores information indicative of trips, or journeys, made by the user of the navigation device 200. The trip recording module stores trip information in a trip database 510, illustrated in FIG. 5, to which the navigation device 200 is communicably coupled. The trip database 510 may be stored local to the navigation device 200, such as in the memory 230 of the navigation device 200, or may be remotely accessible to the navigation device 200 such as via communications channel 318. The trip database 510 stores information indicative of a route taken by the navigation device 200 for each trip or journey. In this sense the term "trip" may be understood as a previous journey. The trip database 510 may alternatively be known as a historical journey database storing information indicative of journeys made by the navigation device 200 including the route followed by the navigation device 200. The trip database 510 may be a layer of information associated with map data, i.e. may comprise information identifying segments in the map data which have been traversed by the user. An exemplary structure of the data stored in the trip database 510 is described below.

The navigation device 200 is also communicably coupled to a favourites database 520 which stores information associated with one or more locations selected by the user of the navigation device 200, i.e. favourite locations. The selected locations may be user-defined points of interest (POI) such as home, work, stations, school, family, restaurant, etc. The favourite locations may be selected by the user either via interaction directly with the navigation device 200 or indirectly such as remotely via a webpage. The user interacts in either manner with the favourites database 520 to select and store therein map locations as favourite locations. Each favourite location is preferably a point location, although alternatively may be a geographic area. As with the trip database 510, the favourites database 520 may be stored local to the navigation device 200, such as in the memory 230 of the navigation device 200, or may be remotely accessible to the navigation device 200 such as via the communications channel 318. Each favourite location may be stored in the favourites database 520 associated with one or more identifiers such one or more of a name, icon or colour selected by the user. At least some of the trips stored in the trip database 510 will be associated with favourite locations stored in the favourites database 520. For example a trip stored in the trip database 510 may be associated with a location in the favourites database 520 at which the user either departed from, or arrived at, on the trip.

Figure 6A:
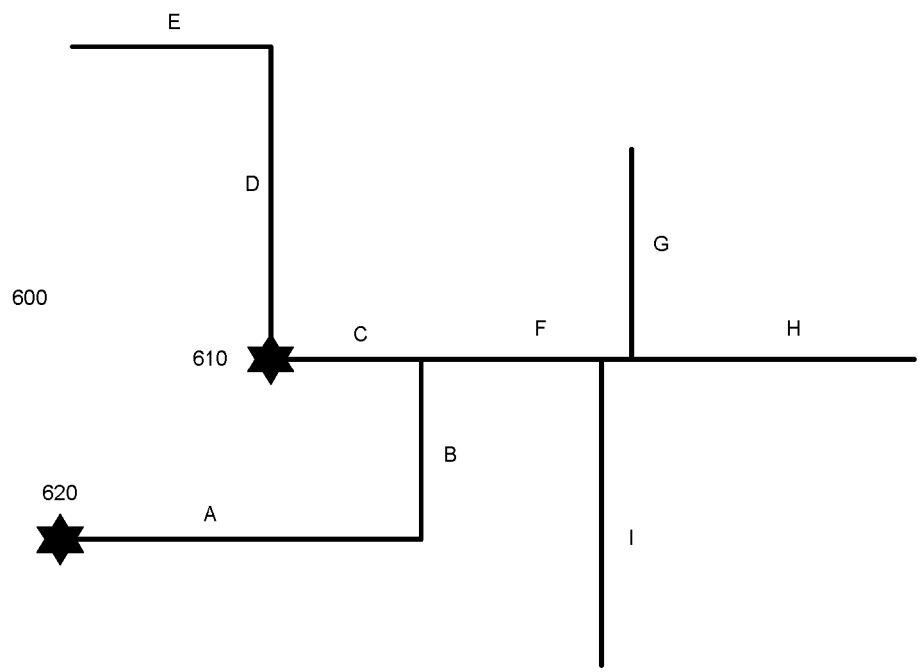
FIGS. 6a and 6b are illustrations of data stored in a trip database according to an embodiment of the invention.

FIG. 6*a* illustrates an exemplary portion of digital map data 600. The digital map data 600 may be formed from information indicative of segments interconnecting nodes, wherein the segments represent a navigable network. Alternatively the map data 600 may be formed by nodes having associated attributes wherein at least some attributes are indicative of connections between nodes having common attributes representing a connection there-between. The connections are indicative of navigable segments in the real world. The navigable segments may be road segments, but may also be segments of any navigable network such as a cycle or path network. Each segment is associated with an identifier such as letters A-I shown in FIGS. 6a and 6b.

The trip information stored in the trip database 510 is indicative of those navigable segments in the map data 600 previously traversed, or travelled along, by the user. Thus the trip database 510 represents a subset of navigable segments in the digital map data 600 which have been travelled by the user. The trip database 510 may be considered as a personal network of the user. That is, the trip database 510 represents the subset of navigable segments used by the user from the set of navigable segments in the digital map data. The trip database may be a layer of information for use in combination with the digital map data, wherein the layer identifies segments in the map data which have been previously traversed by the user. The navigable network may be a road network, although the navigable network may comprise navigable segments of other networks, such as cycle paths, for example. It will be appreciated that the trip database 510 may be flushed of information, for example over a predetermined age, such that the trip database 510 does not store information identifying every road segment ever traversed by the user, but instead represents recent travel behaviour of the user.

If the user travels a route along road segments A, B, F and G illustrated in FIG. 6a information identifying this route with respect to the digital map data including those segments is stored into the trip database 510 by the trip recording module 410.

In some embodiments the information stored in the trip database 510 comprises, for each traversed road segment, one or more of:

a segment identifier, e.g. A;

time information indicating a time of traversal of the road segment; and previous segment information indicating a previous segment from which the user entered the current segment.

The time information may indicate one of a plurality of time slots during which the segment was traversed. For example, a week may be divided into a plurality of time slots which may or may not be equally sized. In one embodiment the week may be divided into 336 time slots of 30 minutes, although other durations may be used. The time information may identify the time slot during which the segment was traversed. Table1 illustrates an exemplary structure of the trip database 510. The trip database 510 comprises four columns. A first column "Trip" stores an identifier to uniquely identify each trip in the database 510. The identifier may be assigned sequentially as each trip is stored in the database 510. The "Segment" column stores information identifying each navigable segment in the digital map data 600 that forms part of the trip or journey. The "Previous Segment" column stores information identifying a segment in the trip from which the user entered the current segment, if the segment is not the first segment forming the trip. The "Time Slot" column stores information identifying one of the plurality of time slots during which the segment was traversed. It will be noted from the example below that for trip 1 segments A and B were traversed in time slot 212, which may correspond to 14:00-14:30 on Thursday, and segment C was traversed during time slot 213 which may, for example, relate to 14:30-15:00 on Thursday. The time slot may identify a time at which the segment began to be traversed.

The "Favourite" column may identify a favourite location from the favourites database 520 when the segment is an end segment of the trip and the end segment is proximal to a favourite location in the database 520. Since it may be expected that a user may not always park at precisely the favourite location, the end segment may be associated with the favourite location in the trip database 510 when an end of the segment is within a predetermined distance of the favourite location. The distance may be 250 m although other distances may be used. It will be appreciated that this allows more than one different road segment to be associated with the same favourite location i.e. multiple segments ending within the predetermined distance of the favourite location.

TABLE 1

Exemplary structure of trip database 510

| Trip | Segment | Previous Segment | Time Slot | Favourite |
|---|---|---|---|---|
| 1 | A | — | 212 | |
| 1 | B | A | 212 | |
| 1 | C | B | 213 | 610 |
| 2 | G | — | 163 | |
| 2 | F | G | 163 | |
| 2 | B | F | 164 | |
| 2 | A | B | 164 | 620 |

In some embodiments the trip database 510 may also store traversal information identifying a number of times each segment in the trip database 510 has been traversed within each time slot. The traversal information may be stored in a separate data structure in the trip database 510 identifying, for each segment in the database 510, a number of times the segment is traversed during each time slot. It will also be appreciated that this information may be derived from the database structure shown in Table 1. This information may be used to delete trips which are not frequently undertaken so that the trip database 510 is maintained at a manageable size.

Some embodiments of the navigation device 200 comprise a prediction module.

In one embodiment, the prediction module is arranged to operatively predict a destination of the user based upon the information stored in the trip database 510. The prediction module is arranged to predict the destination of the user from the personal network of the user of the navigation device 200. In other words, the prediction module is arranged to predict the destination based on information identifying a navigable network of segments previously travelled by the user and the current location of the navigation device. The predicted destination may be selected based on the trip database 510 from amongst the favourite locations stored in the favourites database 520. The prediction module may also predict a route to be followed by the user, even if the user is utilising the navigation device 200 in the "free driving" mode, as will be explained.

A method 700 according to an embodiment of the invention will now be explained with reference to FIG. 7. The method 700 may be performed by the prediction module. The method 700 is a method of predicting a destination of a user of the navigation device 200.

In step 710 the method 700 determines a current location of the navigation device 200 and one or more time slots. The location of the navigation device 200 may be determined from received wireless signals such as GPS signals, at least in part, as described above. The prediction module may receive location information from another module of the navigation device 200. The time may be determined from an on-board clock of the navigation device 200 and compared against a plurality of predetermined time slots used in relation to the trip database 510. The time slot is a time slot within which the current time of day falls. In some embodiments, a plurality of time slots may be determined in step 710 including the current time slot and one or more adjacent time slots, such as time slots before and after the current time slot. Some embodiments may select a plurality of adjacent time slots, e.g. two time slots before and after the current time slot.

Figure 6B:
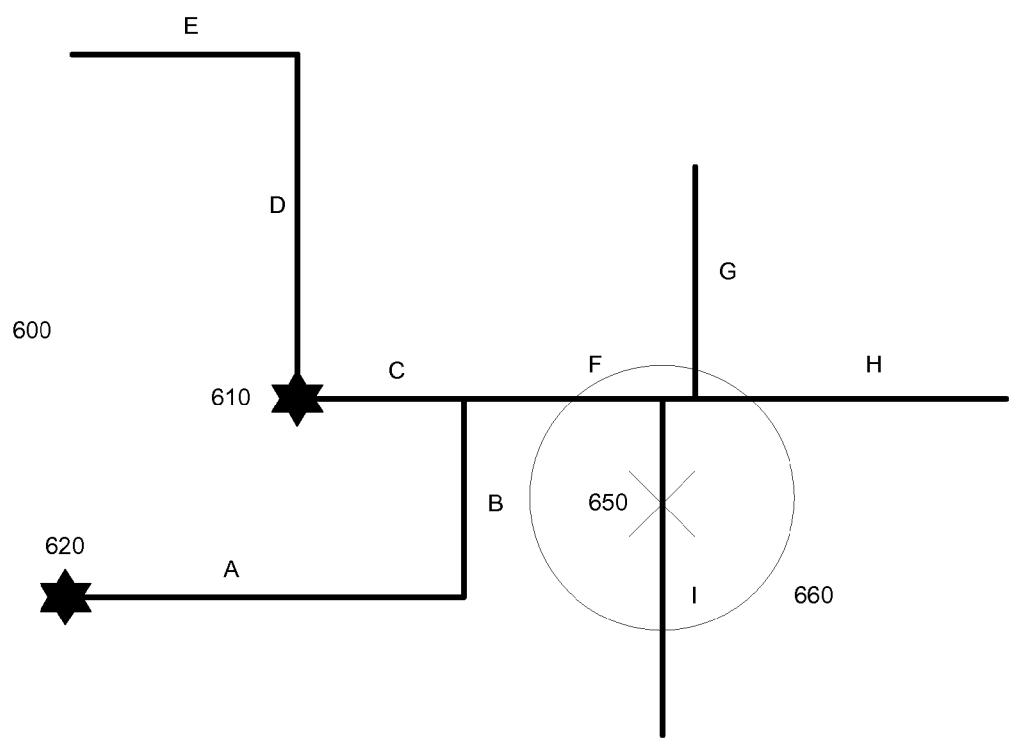

In step 720 one or more road segments are selected based on the current location of the navigation device 200 and the time slot(s) selected in step 710. FIG. 6b illustrates the same portion of digital map data 600 shown in FIG. 6a and a location 650 of the navigation device 200. It can be appreciated that the navigation device (shown at location 650) is currently on segment I of the road network. In embodiments of the invention the destination of the user is predicted based upon the information stored in the trip database 510, i.e. upon segments of the road network which have been previously traversed by the user. It can be appreciated from the exemplary portion of the trip database 510 shown in Table 1 that the user may not be located at the time of execution of steps 710-720 on a previously traversed segment. The user may not be located on any segment, i.e. they may be adjacent a road such as in a car park. Therefore, in order to increase an accuracy of destination prediction, some embodiments of step 720 may select one or more road segments based on the current location and a predetermined radius. The predetermined radius may be 250 m, although it will be realised that this is merely exemplary. FIG. 6b illustrates the predetermined radius 660 around the current location 650 of the navigation device 200. In step 720 one or more segments are selected from the trip database 510 based on the location and time slot(s). It can be appreciated that, whilst segment I is not in the portion of the trip database shown in Table 1, segment F is within the predetermined radius 660 of the current location 650 and is thus selected, along with segment G. It is then determined whether the selected segment(s) were traversed during the one or more time slots selected in step 710 based upon the current time. If each selected segment(s) was not traversed within the selected time slot(s) then they are de-selected from further consideration. Therefore step 720 selects segments which have been traversed by the user at an approximately similar time based on the current location of the navigation device 200. In step 730 it is determined whether any segments are selected as a result of step 720. If no segments are selected, i.e. no segments within the predetermined radius 660 which were traversed at a similar time, then the method moves to step 750. If, however, one or more segments are selected the method moves to step 740.

In step 740 one or more destinations of the user are predicted based, at least in part, on the selected segments. The one or more destinations are predicted based on the traversal information for the selected segments. As noted above, the traversal information identifies a number of times the respective segments have been traversed by the user during the respective time slot(s). The route search algorithm may utilise cost information derived from the traversal information. The cost information may be based on an inverse of the traversal information such that segments having an associated greater traversal count indicating more usage have an associated lower cost, thus being preferentially selected by the route search. Further discussion of modified cost values is provided below. The route search may be a Dijkstra-based search algorithm, e.g. an A* route search (as known in the art), although other searching algorithms may be used. Further details of the modified cost information are provided below. By searching the trip database 510 the prediction module arrives at a road segment associated with a favourite destination from the favourites database 512 which may be used as a predicted destination. As a result of the search being performed with respect to the trip database and segment(s) selected in step 720 a destination and associated route to the destination may be predicted. Some embodiments of step 740 may also select one or more further, less likely, destinations and routes. The most likely destination, and any less likely predicted destinations, may be displayed to the user on the display device, for example in descending order of determined likelihood. Alternatively, step 740 may display an indication of the favourite destination and associated route.

Returning to step 730, as noted above if no segments were selected in step 720 corresponding to the current time slot, or one or more adjacent time slots, then in step 750 one or more segments are selected based on the current location but without limitation as to time. For example, if a proximal segment had been traversed at a dissimilar time then this time slot would not be selected in step 720, but would be selected in step 750.

In step 760 it is determined whether any segments are selected as a result of step 750. If no segments are selected, i.e. no road segments exist in the trip database 510 within the predetermined radius 660, then the method moves to step 780. If, however, one or more segments are selected by step 750 then the method moves to step 770.

In step 770 one or more destinations of the user are predicted based on the selected segments. The one or more destinations are predicted based on a route search of the trip database 510 for the selected segments. Step 770 is as previously described for step 740. One or more routes or favourite destinations associated with those routes may be displayed on the display device allowing the user to select therefrom.

In step 780, if no segments were selected in step 750, then one or more favourite destinations are selected based on a time slot associated with segment(s) adjacent the destination in the trip database 510. For example, for a favourite destination "Office" the segment adjacent (leading to) the destination may be traversed in the time slots 8:00-8:30 on Mondays-Fridays. Step 780 determines an expected arrival time from the current location 650 at each favourite destination in the favourites database 520. If the time slot associated with the expected arrival time corresponds to a time slot of an adjacent segment in the trip database 510 then the favourite destination is selected in step 780. It will be realised that in some embodiments a degree of error may be allowed in step 780 by considering, for example, a time slot of the expected arrival time and an adjacent time slot either side. The expected arrival time may be determined based on an "as the crow flies" route at a predetermined speed, for example 60 kmh$^{-1}$. In this way it is unnecessary to calculate a route to each favourite destination from the current location via the road network. Step 780 allows for the user starting from an unfamiliar location and heading to a favourite destination. The selected favourite destinations may then be displayed on the display device for selection by the user. Step 780 may not provide a route from the trip database 510.

Figure 7:
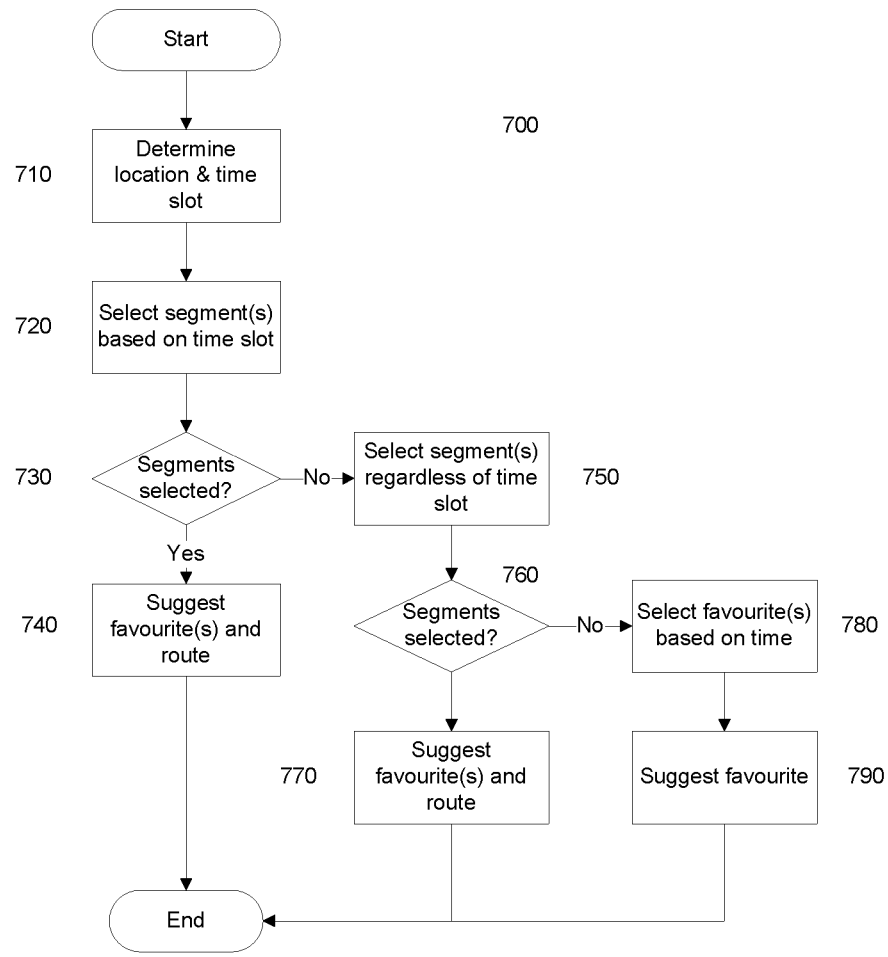
FIG. 7 illustrates a method according to an embodiment of the invention.

It will be appreciated that the method 700 shown in FIG. 7 is able to provide suggested destinations and, for some destinations, routes to those destinations based on the trips database 510 and the favourites database 520. Thus the method 700 is particularly suitable for suggesting regularly used destinations based on previous behaviour of the user as characterised by the information indicative of previous trips or journeys stored in the trip database 510.

Figure 8:
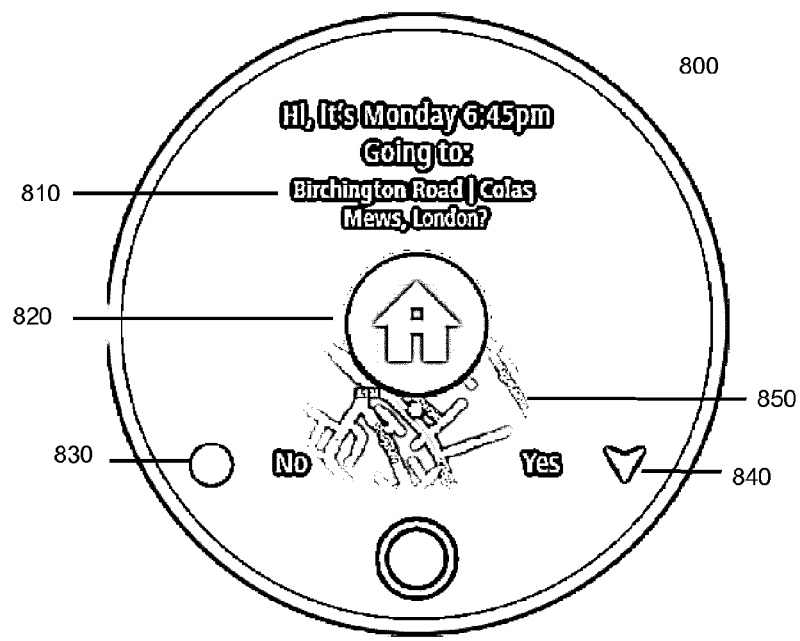
FIG. 8 is an illustration of a suggested destination interface according to an embodiment of the invention.

FIG. 8 illustrates a suggested destination interface 800 according to an embodiment of the invention. The interface 800 provides an indication to the user of a destination, preferably one of the locations stored in the favourites database 520, suggested according to the method described above. The interface 800 comprises one or more of: a name 810 of the suggested destination, such as a text string indicative of the street address (although it may be a word associated with the stored favourite, e.g. "home"); an icon 820 associated with the destination and controls for the user to either reject 830 or accept 840 the suggested destination. Some embodiments may further comprise a background image 850 which may be a representation of a portion of the digital map data proximal to the location of the suggested destination.

Embodiments of the invention are arranged to determine a route to a destination which favours, or preferentially selects, segments on which the user has previously travelled. As noted above, the digital map data represents a road network using road segments to interconnect nodes. Each segment may have one or more associated attributes each indicating a cost for traversing that segment according to a respective characteristic. For example, a first attribute may indicate a cost for an expected speed of traversing the segment whilst a second attribute may indicate a cost for expected fuel consumption in traversing the segment. A routing algorithm when determining a route between an origin location and a destination location selects segments for inclusion in the route based on their associated cost and one or more routing criteria.

Embodiments of the invention determine or modify a cost for one or more segments based, at least in part, on the trip database 510. A cost attribute for at least one road segment in the digital map data is updated or modified according to the presence of the road segment in the trip database 510 and/or whether the road segment forms part of the predicted route determined by the prediction module.

For example, three road segments are present in the digital map data $S_1$, $S_2$, $S_3$; each road segment having an associated cost attribute. The cost value in the digital map data may be an existing cost value used to indicate a characteristic of the road segment, such as travelling speed or fuel consumption, or may be newly introduced. In the case of a newly introduced cost value, the cost associated with each road segment in the digital map data may be initially set to the same value such that a routing algorithm does not preferentially select road segments based on that cost value.

The exemplary trip database 510 does not contain an entry for segment $S_1$ indicating that the user does not travel via this road segment, or at least has not travelled via this road segment recently. However the trip database 510 contains entries for road segments $S_2$ and $S_3$, and thus the cost values for segments $S_2$ and $S_3$ in the digital map data are updated to reflect their presence in the trip database 510. The routing algorithm is caused to preferentially select segments having a lower cost. For example, the routing algorithm is caused to preferentially select segments $S_2$ and $S_3$ over $S_1$ in the case that all other routing criteria are equal for the segments. It will be appreciated that the routing algorithm may still base the determination of a route on one or more other factors, such as travelling speed, time, fuel consumption etc, for the segments. Thus for a particular start location and destination location segment $S_3$ may still be chosen over $S_2$. However, where possible, the routing algorithm favours segments included in the trip database 510. Furthermore, where a route has been predicted as described above, such as in steps 740 and 770 in FIG. 7, the cost values in the digital map data associated with segments forming the predicted route may be further modified to increase the tendency of the routing algorithm to select those segment(s). For example, if segment $S_3$ forms part of the predicted route, the cost is preferably further modified so that segment $S_3$ would be preferentially chosen over $S_2$, assuming all other factors being equal.

It will also be appreciated that the cost information for road segments in the map data may also be modified based on historic information. In one embodiment at least some of the segments in the map data may be associated with a historic speed profile indicative of an average speed of travel on that road segment during a plurality of periods of time. For example the historic speed profile may define 5 minute intervals for each day of the week and the average speed during each of those intervals. The historic speed profile may be determined from probe data. The historic speed profile may a reference profile, but may instead be one of a plurality of standard reference profiles. In other words the probe data on which the historic speed profile is based may not necessarily relate to that particular road segment. Thus a scalar may also be utilised with the historic speed profile to scale the historic speed profile according to data measured for that particular road segment. The one or more historic speed profiles and scalars may be stored and communicated separately from the map data, such as being stored in a memory of the navigation device.

Real-time data may be obtained for the road segment from one or more sources such as GPS probe data, GSM probe data and journalistic data. Based on the obtained real-time data and the appropriately scaled historic speed, traffic events may be identified when the real-time data differs from the scaled historic speed information. In response to a traffic event being identified a traffic message may be communicated to navigation devices within a predetermined range of a location associated with the traffic event. Traffic messages deemed to be important, such as those relating to a particular class of road or above, may be communicated to navigation devices within a second, larger, range of the location. In this way, cost information associated with road segments in the map data may be modified to indicate a lower speed of travel.

Figure 9:
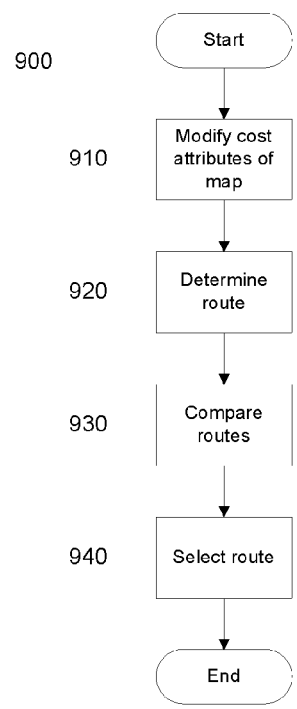
FIG. 9 illustrates a method according to an embodiment of the invention.

A method 900 according to an embodiment of the invention will now be described with reference to FIG. 9. The method 900 may be performed by a route attribute module of the device 200.

In step 910 one or more cost values associated with digital map data are modified, as described above, based on the trip database 510. Thus, in one embodiment the cost values are modified based upon the presence of road segments in the trip database 510 so as to preferentially select or bias the routing algorithm towards road segments which the user has previously traversed. Similarly, in some embodiments the modification of the cost values is extended to further preferentially select or bias the routing algorithm towards segments in the predicted route, as described above.

In step 920 a route between a current location of the navigation device 200 and a destination location is calculated. The destination location may be a favourite location stored in the favourites database 520. The determination of the route is based upon the modified cost values associated with road segments determined in step 910. In some embodiments of step 920 a route to the destination location may also be calculated only on the basis of the digital map data, i.e. without modified cost values.

In step 930, which is optional dependent on the previous calculation of a route using unmodified cost values, an attribute associated with each of the two routes is compared. The attribute may be a travelling time to the destination. For example, in step 930 the time taken to reach the destination by each of the two routes is compared.

In step 940 one of the routes is selected based on the comparison performed in step 930. The route determined according to the modified digital map costs may be selected as a default in step 940. However the route determined according to the original or unmodified digital map costs may be selected if he attribute, such as time taken, for the modified costs route is more than a predetermined margin greater than the unmodified costs. The margin may be 25% or 50% greater, although it will be realised that these are merely exemplary. therefore the route determined upon the digital map data alone is selected if it is, in one embodiment, more than 50% quicker, i.e. shorter in time, to reach the destination. Otherwise the route determined based upon costs values modified according to the trip database 510 is selected in step 940.

Some embodiments of the invention provide an indication of an attribute of a route, such as an estimated time of arrival (ETA) at a destination location. It will be realised that embodiments of the present invention may be applied to other attributes of a route, such as fuel consumption, for example. In embodiments of the invention, the ETA value is provided for at least one route determined as described above which preferentially includes segments in the trip database 510 and, in some embodiments, more preferentially those segments in a predicted route. The ETA value may be based upon an expected travelling speed or travelling time of the segments forming the route and may be modified according to information received by the navigation device 200, such as traffic and/or weather information. The received information may cause the expected travelling speed to be reduced or the expected travelling time to be increased of one or more road segments included in the route.

Embodiments of the invention recalculate an ETA via at least one alternate route based on the trip database 510 in response to received information such as traffic and/or weather information. In response to the received information the route may be changed so as to continually follow the route having the shortest ETA. When a location of the user, and hence navigation device 200, reaches or is proximal to a decision point ETA information is displayed along with ETA information associated with at least one alternate route. A decision point is a point along a route at which one or more alternate routes to the destination are possible via a "travel network" of road segments of the digital map. The travel network comprises the road segments of the personal network and stored in the trip database 510, together with any road segments forming a calculated primary route to the destination (in situations where a predicted route to the destination is not determined by the prediction module). In other words, the travel network is a subset of road segments of the digital map along which it is believed a user will travel to the destination, e.g. based on previous trips made by the user. For example, a decision point is a junction where a first road from the junction forms part of a current route to the destination on the travel network, but where a second road from the junction forms part of an alternate route the destination using the travel network. ETA information includes a time at which the user is expected to arrive at the destination and an expected remaining duration of the journey.

Figure 10:
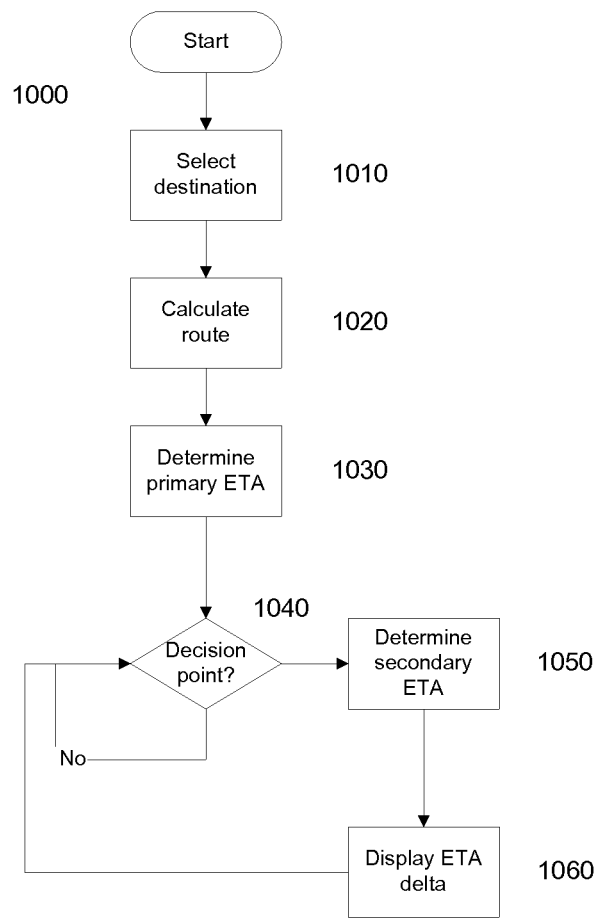
FIG. 10 illustrates a method according to an embodiment of the invention.

A method according to an embodiment of the invention will now be described with reference to FIG. 10. The method may be performed by a route attribute module.

In step 1010 a destination is selected. The destination may be received by the navigation device 200 from the user, such as the user entering a name of the destination, or other details, into the navigation device 200. The destination may be selected by the user from amongst a plurality of destinations. The plurality of destinations may be destinations stored in the favourites database 520. In one embodiment, the user is provided with a list of destinations retrieved from the favourites database 520 from which to select the desired destination, such as by pressing on an appropriate area of the display device. However in other embodiments the destination may be that predicted by the navigation device 200, as previously described. The destination may have been automatically selected by the navigation device 200. In one embodiment the destination may be automatically suggested or provided to the user and confirmation received from the user indicative of the destination being correct.

In step 1020 a primary route to the selected destination is calculated. The primary route may be calculated as previously described with reference to FIG. 9 based upon the trip database 510 and/or a route predicted using the prediction module.

In step 1030 an ETA is determined of the user at the destination following the primary route determined in step 1020. The ETA may be solely based on the attributes of the digital map data, such as travelling speeds associated with road segments, or may also include data relating to the speed of one or more users previously travelling along those road segments, so called historical data. Furthermore, the ETA may be based upon information previously received by the navigation device 200 such as traffic and/or weather information which affects travelling speeds of road segments forming the route. The ETA may be displayed on the display device 240 in step 1030. The ETA may be an expected arrival time at the destination, or journey duration. The ETA for the current route may be known as a primary route ETA.

Figure 11:
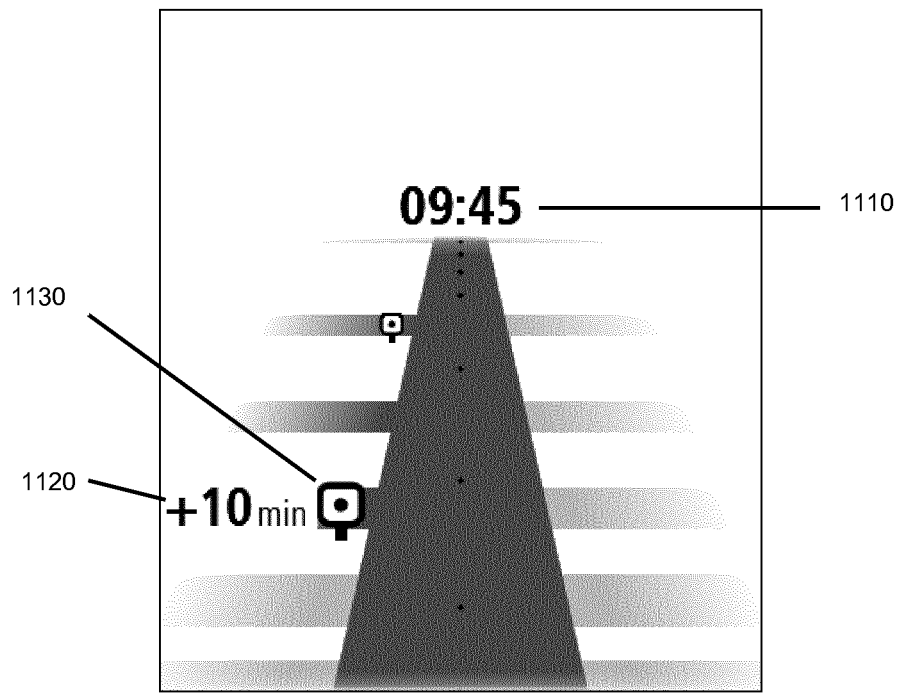
FIG. 11 is a display screen for a navigation device according to an embodiment of the invention.

FIG. 11 illustrates an embodiment of a display screen showing the ETA. The display screen is arranged to provide an indication of the route to be followed and ETA information 1110 which comprises an expected arrival time 1110. As can be appreciated, the display screen shown in FIG. 11 is indicating that the user should continue straight ahead toward the indicated expected arrival time 1110, i.e. continue following the current road segment. However it can be appreciated that an upcoming left turn is indicated with associated time information 1120, as will be explained. Therefore the user is approaching a decision point where the user faces a decision regarding making the possibly indicated turn. In other words, the primary route is to continue straight ahead whereas a secondary route to the destination exists via the upcoming left-turn, wherein the primary and secondary routes intersect at the decision point. The route via the left turn is the secondary route because it does not form the current optimal route to the destination, i.e. having the shortest ETA. Therefore the secondary route is an alternate route to the destination.

In step 1040 the method determines whether a decision point on the route has been reached, or is proximal to the current location of the navigation device 200. For example, it may be determined whether the current location of the navigation device is within a predetermined distance such as 500 m of the decision point. As noted above, the decision point is a point on the current route where a plurality of diverging road segments present in the travel network are available to reach the destination.

Once the navigation device 200 is at, or proximal to, the decision point the method moves to step 1050. In step 1050 an ETA at the destination via the alternate route accessible at the decision point is determined. The ETA may be known as the secondary route ETA. It will be expected that the secondary route ETA will be greater than the primary route ETA. It will be noted that the secondary route ETA does not necessarily need to be calculated in response to the device being proximal to the decision point. The secondary route ETA may already be stored in the memory of the navigation device 200, for example as a result of the route calculation step 1020 or a subsequent recalculation of the route in response to received traffic and/or weather information.

In step 1060 an ETA delta 1120 indicative of the time difference between the primary and secondary route ETAs is generated in step 1060 and is displayed on the display device 240 as shown in FIG. 11. In some circumstances, for example due to changed traffic conditions indicated by the received traffic information, the primary route first selected may have a longer ETA than the secondary route. In which case the primary and secondary routes may be reversed, i.e. the user indicated to follow the secondary route having the shorter ETA. In this case, the ETA delta is indicative of the difference in following the longer route represented by the previous primary route. Alongside the ETA delta 1120 in FIG. 11 is a symbol 1130 indicative of a speed camera being present on the secondary route. It will be realised that this may be omitted from embodiments of the invention. Although not shown in FIG. 11, the display device of FIG. 11 may additionally show the location of traffic jams, and an associated delay, or other similar travel information.

As can be appreciated, embodiments of the invention described with reference to FIGS. 10 and 11 periodically update the user with information about an attribute, such as ETA, of routes to a destination as the user approaches decision points along a primary route. Thus the user is able to decide whether to continue on the current primary route or to follow the secondary route to the destination in view of the information associated with the difference between the primary and secondary routes. Although the above description refers to primary and secondary routes it will be realised that more than one alternate route to the destination from a decision point may exist.

Some embodiments of the invention include a driving view module which is arranged to operatively display on the display device 240 a representation of a road network based on the digital map data. The driving view module is arranged to generate a schematic representation of the road network within a field of view of the user based on the location of the navigation device 200. The representation provides the user with an indication of a road topology within the user's field of view. In particular, the driving view module is arranged to provide a simplified schematic representation of the road network within a predetermined range of the current location. In some embodiments, the predetermined range is based upon a class or type of road to which the current location corresponds. In particular, some embodiments of the invention are arranged to distinguish between roads present in the trip database 510 and those merely present in digital map data, as will be explained.

Figure 12:
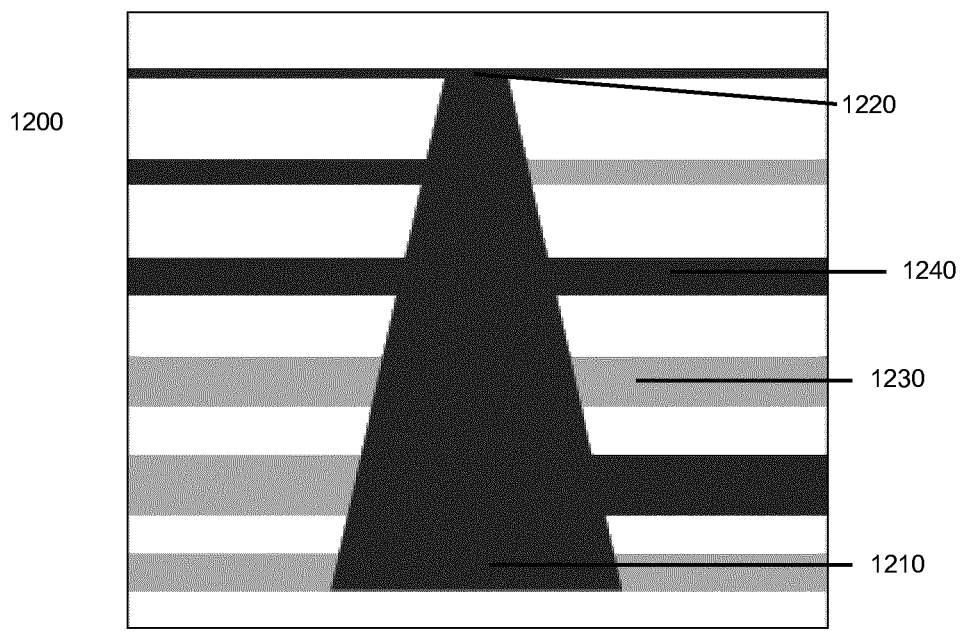
FIG. 12 is a display screen for a navigation device according to an embodiment of the invention.

An illustration of a representation provided on the display device by the driving view module is shown in FIG. 12. As noted above, the digital map data comprises information indicative of a layout of a road network in a geographic area and the trip database 510 stores information indicative of a subset of the road network previously travelled by the user of the navigation device 200, i.e. the personal network of the user of the navigation device 200 as identified from the trip database 510. The driving view module is arranged to distinguish, on the display device 214, roads present in the trip database 510. The roads in the trip database 510 are distinguished in the representation from roads only present in the digital map data.

Figure 13:
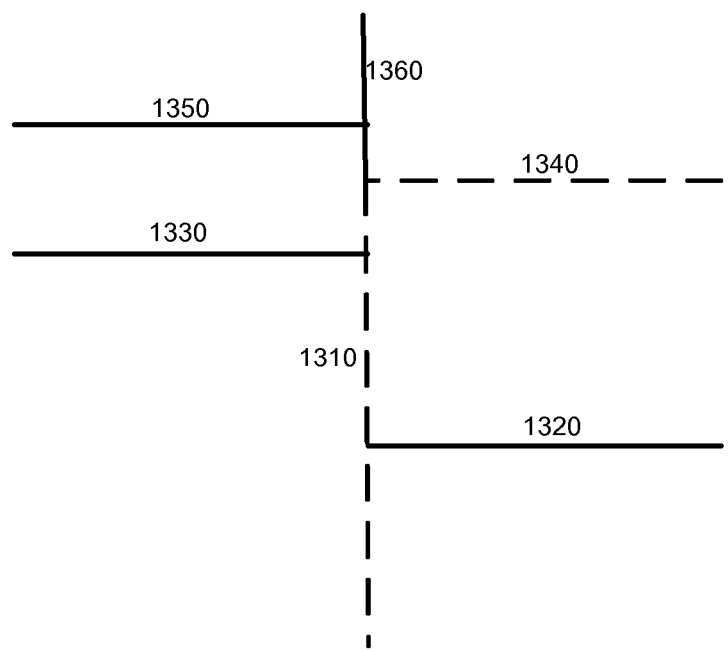
FIG. 13 is an illustration of digital map data and data stored in the trip database according to an embodiment of the invention.

FIG. 13 illustrates a portion of digital map data and a corresponding portion of the trip database 510. The portion of digital map data comprises information relating to roads 1310-1360 whilst the trip database 510 comprises information indicative of roads 1310 and 1340 (as distinguished in broken lines) i.e. the user has only previously driven along road segments 1310 and 1340 and not along, for example, road segment 1330, at least within the history of trip database 510. It will be appreciated that road segments 1310, 1340 are included within the digital map data and trip database 510 whereas road segment 1330 is only included within the digital map data.

Referring again to FIG. 12, the display device 240 is caused to display the driving view 1200 comprising a schematic illustration of roads within the user's field of view up to a predetermined range from the current location of the navigation device 200. The current location 1210 is identified as a location at a bottom-centre of the display device 240. A current road segment on which the user is located or currently travelling, is arranged to project upwardly away from the current location 1210 and is schematically represented as a straight line extending forward away from the user's location 1210 at a base of the display device 240 to an upper area 1220 of the display device 240. The portion of road segment between the current location 1210 and the upper area 1220 is that within the predetermined range. In an exemplary embodiment the predetermined range is 800 m, although it will be realised that this may be suitably chosen. In one embodiment, the predetermined range may be a first range, such as 800 m for roads of one or more predetermined classes or types, such as main roads, or a second range, such as 400 m, for one or more predetermined classes corresponding to minor roads. The ranges may be chosen accordingly such that the first range is greater than the second range. It will be noted that the current road segment is schematically represented as a straight line. The straight line runs from an origin indicative of the current location to a horizon. In contrast the digital map data indicative of the current road segment may comprise information indicative of a curvature of the road segment i.e. the road segment may not be geographically straight.

The driving view 1200 further comprises a representation of roads which are accessible from the current road segment via an exit such as a junction. The roads are represented as being arranged at 90 degrees to the current road segment, although it will be realised that this is not necessarily the angle of intersection of the real-world road network. Furthermore, it will be noted that roads are graphically denoted as being one of two types according to the trip database 510. Road segments adjacent the current road segment which are not identified in the trip database 510 are indicated in a "greyed-out" style such as road 1230. The greying out is used to indicate to the user that they have not previously travelled along this road, i.e. that the corresponding road segment is not listed in the trip database 510. It will be appreciated that the user may have travelled along the road previously and such recorded usage has been expunged from the trip database 510 such as during management of the trip database 510 size. Road segments identified in the trip database 510 indicative of the user's previous use of the road are displayed in a highlighted manner, such as road 1240. The highlighting is used to indicate that the road will be familiar to the user. Referring again to FIG. 13 which illustrates a portion of the digital map data comprising road segments 1310-1360, although the road segments are shown as intersecting at 90 degrees it will be realised that this is merely for illustration. When travelling along road segment 1310 the adjacent road segment 1340 is highlighted in the driving view in the manner of road 1240 in FIG. 12 whilst, for example, road 1320 is indicated as greyed-out. It will be noted from FIG. 12 that the current road extending forward from the current location is highlighted. However it will be appreciated that the current road may be partially greyed out where the user has only previously travelled along part of the road shown ahead within the range shown on the display device.

Embodiments of the invention relate to the provision of relevant, or at least potentially relevant, traffic information. In some embodiments of the invention traffic information which has a likelihood of being relevant to the user is provided. In some embodiments of the invention traffic information which is possibly relevant to the user is provided. Embodiments of the invention relate to providing a list of traffic information to the user.

Embodiments of the invention comprise a traffic information module which is arranged to operatively provide traffic information to the user. In one embodiment the traffic information module determines traffic information which is at least potentially relevant to the user based on the trip database 510. As explained above, the trip database 510 stores information indicative of road segments which have previously been traversed by the user, at least within the lifetime or maintenance period of the trip database 510. Thus the content of the trip database 510 represents a personal road network of the user of the navigation device 200.

The traffic information module receives traffic information associated with the digital map data. The traffic information may first be received, such as over a wireless, e.g. GPRS, connection, by another module of the navigation device 200 and provided to the traffic information module. The traffic information may include, without limitation, information relating to traffic jams or delays caused by accidents, road or lane closures, road works, weather conditions, etc. The traffic information comprises traffic events associated with respective locations in the digital map data. The location associated with a traffic event may correspond to one or more road segments in the digital map data. The traffic information module operatively filters the received traffic information by determining items of traffic information associated with road segments present in the trip database 510. The traffic information module is arranged to filter out traffic events which are not associated with the personal network stored in the trip database 510. In other words, if a traffic event is associated with a road segment which is not indicated in the trip database then the traffic information module is not responsive to that traffic event. However, if the traffic event is associated with a road segment in the trip database 510, the traffic information module further utilises or processes that traffic event. Thus only traffic events associated with the personal road network of the user are utilised. The traffic information may further be filtered by the traffic information module based on one or more of a driving time or distance from the current location, or an as-the-crow-flies distance from the current location.

Hereinafter traffic events determined as potentially relevant following filtering by the traffic information module are referred to as probable traffic events.

In some embodiments the traffic information module is arranged to generate no-jam events based on the trip database 510. The term "no-jam" is used broadly to mean "no-event" as encompassing a lack of traffic and weather events. A no-jam event is indicative of there being no traffic events associated with a road segment or location in the trip database 510. The traffic information module may determine no-jam events only for one or more predetermined classes of road i.e. major roads, such as motorways, highways etc., in order to avoid an excess of no-jam events being generated. Further details of the no-jam events are provided below.

The traffic information module may determine a probability value for one or both of the probable traffic events and the no-jam events. The probability value is indicative of a probability of the user actually traveling along the road segment associated with the respective probable jam or no-jam event. The probability value may be indicative of the user experiencing the traffic or no-jam event. The probability may be based upon one or more of: whether the event is on a road segment forming part of a current route to a destination, such as a destination predicted as described above; a direction of the road segment to which the event applies; a distance between the current location of the navigation device 200 and the event; and a travelling time between the current location and the event.

In one embodiment of the invention, a method of determining the probability comprises determining a current timeslot, i.e. the timeslot into which the current time falls into, which may be calculated as:

$$timeslot = \left(timestamp \ \% \left(\frac{3600*24*7}{1800}\right)\right)$$

wherein 3660 is the number of seconds in an hour, 24 is the number of hours in a day, 7 is the number of days in a week, 1800 is the number of seconds in half an hour, and % is the modulus operator. Thus the variable timeslot is one half-hour period of the week.

The method further comprises determining a minimum distance to a node associated with the event. The distance may be a distance between the current location and a nearest node associated with the event, such as a node at an end of a road segment to which the event applies. The distance may be as the crow flies.

A time difference timediff may be calculated which is indicative of a time required for the user of the navigation device 200 to arrive at the event. The time may be calculated based upon the minimum distance and the current timeslot.

The probability may then be calculated based upon the time difference. In one embodiment the probability P may be calculated as:

$$P = \left(\frac{336 - timediff}{336}\right)*100$$

wherein 336 is the number of timeslots in a week which it will be realised may be varied. Thus the probability of an event is greater for events which are closer to the location of the user. The probability value may be further modified by, for example, whether the event is on a road segment forming part of a current route and/or a direction of the road segment to which the event applies, i.e. northbound carriageway, in relation to the user's current direction of travel.

Figure 14:
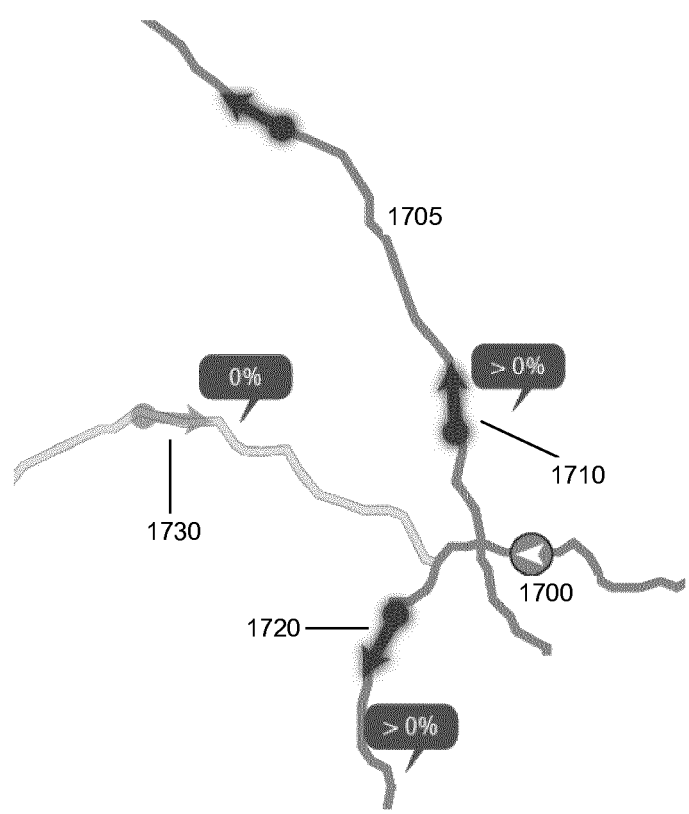
FIG. 14 is an illustration of a portion of a road network and traffic information according to an embodiment of the invention.

FIG. 14 illustrates a portion of the personal network determined from the trip database 510. A location of the navigation device is indicated as 1700 in relation to first to third probable jams 1710, 1720, 1730 which are present on navigable segments included within the personal network. The first and second 1710, 1720 jams have respective associated probabilities which are greater than 0 and thus represent probable jams which the user may encounter. However the third probable jam, although on a navigable segment forming the personal network and within a predetermined range of the current location 1700, has a probability of 0% due to, for example, the traffic event relating to a road segment having an opposing direction of travel to the current travel direction of the user.

Figure 15:
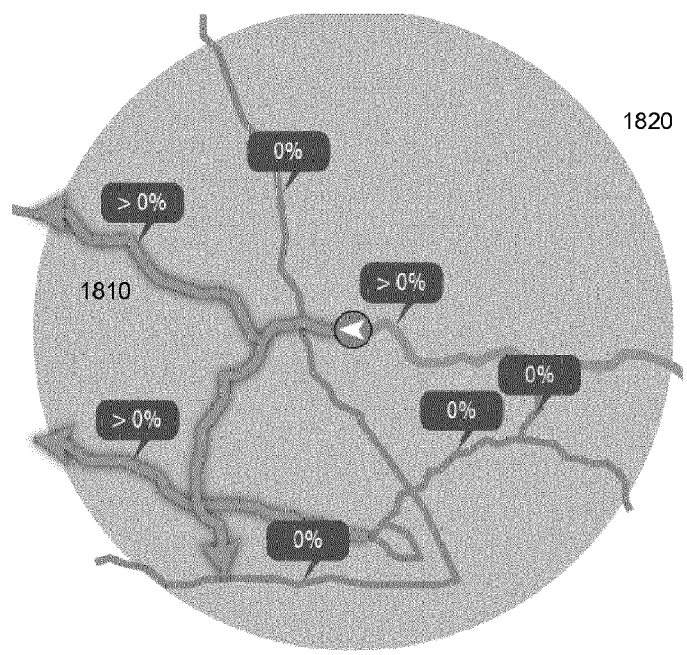
FIG. 15 is an illustration of a portion of a road network and traffic information according to an embodiment of the invention.

FIG. 15 illustrates a region of the personal network for which a plurality of no-jam events have been generated, only one of which is indicated with a reference numeral 1810. Each no-jam event is determined as relating to a road having a number in its name, thus being at least a predetermined class or type of road, the road segment being more than a predetermined length such as 600 m, the road being within a predetermined range 1820 of the current location such as 50 km, as indicated and the road being less than a predetermined travelling time from the current location such as 35 minutes.

In some embodiments of the invention the traffic information module is arranged to determine possible traffic events. A possible traffic event is one which may be relevant to the user, but which does not relate to the personal network i.e. a possible jam relates to a navigable segment in the digital map data which does not form part of the personal network stored in the trip database 510. A possible traffic event may be determined to relate to a road segment or location within a predetermined distance of a current location of the navigation device 200. The predetermined distance may be, for example, 50 km of the current location and may be a haversine distance of the current location, as the crow flies, or via the road network. Furthermore, in some embodiments of the invention, possible traffic events may be determined to relate to a predetermined direction in relation to one or both of a course or heading of the road segment associated with the traffic event, and a predetermined angle in front of the navigation device's heading.

Figure 16:
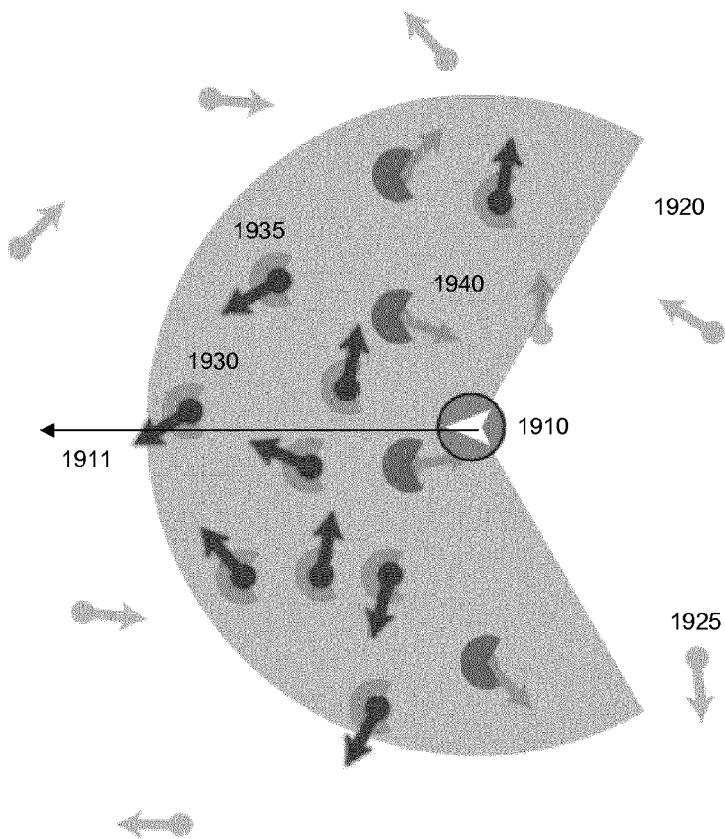
FIG. 16 is an illustration of traffic information according to an embodiment of the invention.

Referring to FIG. 16, a current location of a navigation device 200 is indicated 1910 and a current heading 1911 of the navigation device 200. The current heading 1911 is a direction of travel of the navigation device 200. The heading may be instantaneously determined i.e. based on the direction of travel at that moment. However the direction of travel may, in some embodiments, be determined based on an average direction of travel over a predetermined period of time prior to the current time, such that direction of travel is not excessively affected by, for example, a bend in a road which may influence the instantaneously determined direction. A predetermined sector 1920 ahead of the current direction of travel 1911 is determined. The predetermined sector 1920 may assume an angle either side of the current direction 1911, for example ±60°, although it will be realised that other angles may be chosen. Traffic events not located within the predetermined sector 1920, such as traffic event 1925 are not considered as possible traffic events. A direction of each traffic event 1930 may be considered in some embodiments. A direction of a traffic event may be determined from the road segment, and possibly direction upon the road segment, with which the traffic event is associated. Traffic events may be uni-directional where associated with a carriageway of a road segment, whilst others may be bi-directional where applying to both carriageways, or a road segment in general. A direction of a traffic event is indicated as 1930. If the direction 1930 is within a predetermined angle of the current direction of travel, indicated specifically as 1935, then the traffic event may be a possible traffic event. For example, traffic event 1940 is not a possible traffic event as its direction is not within the predetermined angle of the current direction of travel 1935, 1920. The predetermined angle may be the same as that used for the predetermined sector 1920 or assume a different angle.

Figures 17, 18:
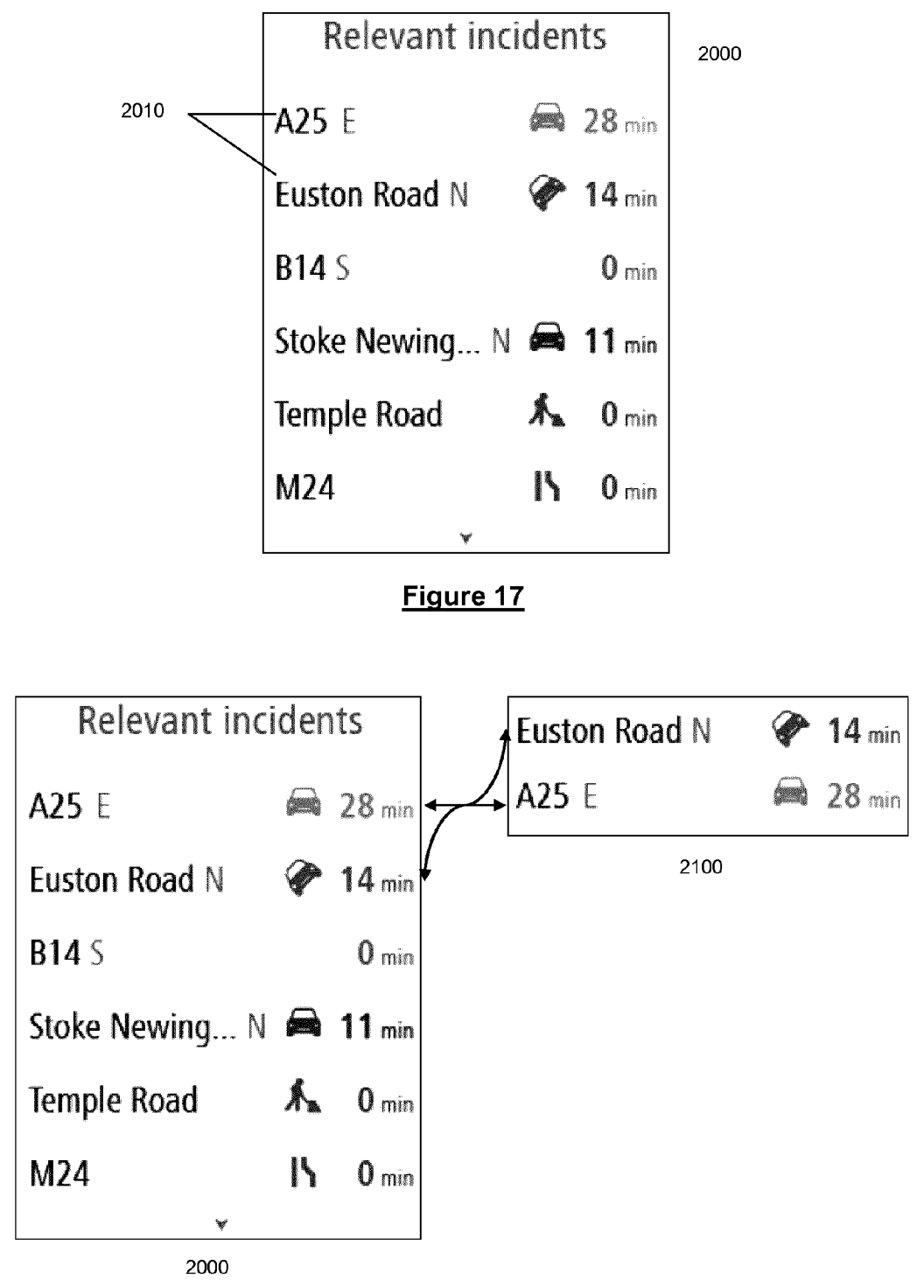

FIG. 17 illustrates an incident list 2000 according to an embodiment of the invention. The incident list 2000 is generated by the traffic information module and displayed on the display device 240. The incident list 2000 comprises a plurality of items of incident information 2010, or incident items. The incident list 2000 may contain a predetermined maximum number of incident items. The items of incident information may be listed in a ranked order determined according to an embodiment of the invention. In such ranked order the incident items most relevant to the user are displayed toward a top of the list 2000. Each item 2010 comprises an indication of a road segment to which the item applies, an indication of the type of incident and an indication of a delay time associated with the incident. The indication of the type of incident may be a graphical indication selected from amongst a plurality of types of incident. For example the incident at a head of the list 1900 in FIG. 20 graphically indicates that the incident is heavy traffic having an associated 28 minute delay, whereas the second incident is of type accident having a delay of 14 minutes. A colour of the graphical indication may be selected to indicate a severity of the delay.

The incident list 2000 may be generated by the traffic information module based upon the above-described probable traffic events, no-jam events and possible traffic events. In one embodiment, probably traffic events and no-jam events take precedence over possible jam events. That, it possible traffic events are only displayed when the incident list 2000 is not fully occupied by probable traffic events or no-jam events. Furthermore, when the incident list 2000 comprises all three events the probable and no-jam events are listed above possible traffic events. The incidents 2010 may be sorted by criteria including alphabetically based on road segment name or number, severity, distance from a current location. However in one embodiment the incidents are sorted based on a relevance score determined according to an embodiment of the invention.

In some embodiments the traffic information module is arranged to determine a relevance of each probable traffic event and no-jam event. The relevance may be based on at least one of: a distance to the traffic event, a delay caused by traffic event (i.e. severity), a tendency of the traffic event (i.e. whether the delay caused by the event is increasing and/or decreasing), and a predicted duration of the traffic event (i.e. a prediction of when the traffic event will end).

In one embodiment of the invention, the relevance of each traffic event is determined according to:

$$R = P \times \left(\frac{D - Di}{c}\right)$$

wherein R is a relevance score, P is the probability associated with the traffic event as described above which may assume a value between 0 and 1, D is a delay associated with the traffic event, Di is a distance of the current location from the traffic event and c is a constant which, in one embodiment, is 7 although it will be realised that other values may be chosen.

In one embodiment a relevance of a possible traffic event is determined as:

$$R = \left(\frac{D - Di}{c}\right)$$

wherein Di is a distance of the current location having 20 km subtracted, but not going below 0 distance.

In some embodiments the incident list 2000 is displayed in a dedicated screen or GUI on the display device 240 i.e. the incident list occupies substantially the entirety of the display device 240. In some embodiments, a short incident list may be displayed in combination with a representation of the road network proximal to the location of the navigation device 200, such as that shown in FIG. 12. An embodiment of the short incident list 2100 is shown in FIG. 18. The short incident list 2100 is shown alongside the incident list 2000 shown in FIG. 17. However it will be realised that the two are not displayed on the display device together and that they are shown alongside each other in FIG. 18 for the purpose of explanation. The short incident list 2100 comprises incident items selected from those in the long or complete incident list. Thus a method step according to an embodiment of the invention comprises selecting one or more items from the full incident list 2000. The selected items may be a first predetermined number of items from the full incident list 2000. The first predetermined number may be the most relevant items, such as the top $1^{st}$ and $2^{nd}$ items from the full incident list 2000. However when a location of the navigation device 200 is within a predetermine distance of a first, top ranked, incident in the full incident list, the first incident may be omitted from the short incident list 2100. The predetermined distance may be 800 m, although it will be appreciated that other distances may be used. In this case, the $2^{nd}$ and $3^{rd}$ incident items are selected for inclusion in the short incident list 2100. It will be appreciated that more than two incident items may be shown in the short incident list, but less than the number in the full incident list 2000. Furthermore, it can be appreciated from FIG. 15 that an ordering of the incident items in the short incident list 2100 is reversed from that in the full incident list 2000. The first and second incident items selected from full incident list 2000 (themselves being the $2^{nd}$ and third items the full incident list 2000) are transposed in order to form the short incident list 2100. Where only one probable traffic item is present in the full incident list as an incident item and the remaining items are no-jam events, an item indicative of there being no-jams on any road may be displayed in the short incident list 2100.

Figure 19:
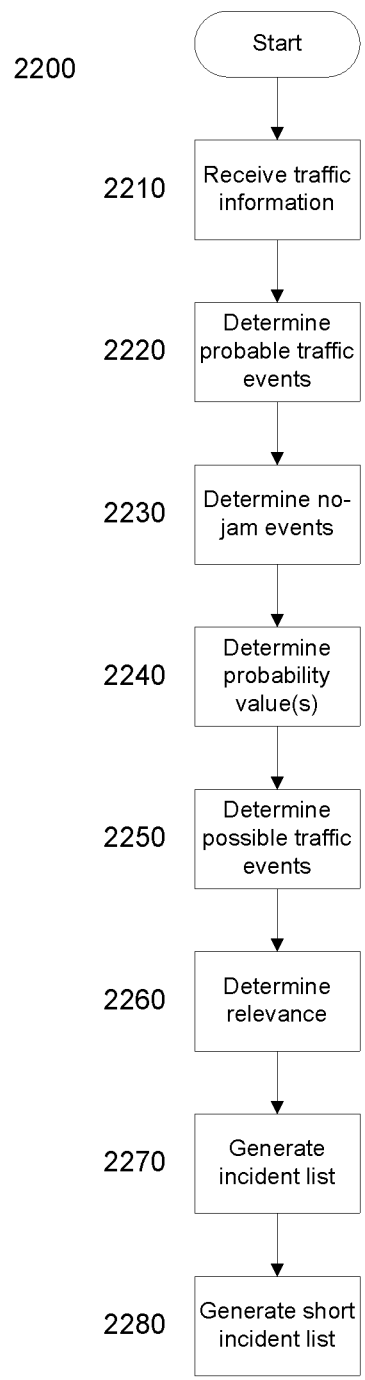
FIG. 19 illustrates a method according to an embodiment of the invention.

FIG. 19 illustrates a method 2200 for providing traffic information according to an embodiment of the invention. The method may be performed by the traffic information module. Details of steps forming the method are provided above. The method 2200 comprises a step 2210 of receiving traffic information. The traffic information may be received by the navigation device wirelessly for example via a data connection from a server or in a broadcast form e.g. over FM or digital radio signals. In step 2220 any probable traffic events are determined based on the received traffic information and the trip database 510. In Step 2230 any no-jam events are determined. In step 2240 probability values are determined for the probable and no-jam traffic events. In step 2250 any possible traffic events are determined based on the received traffic information and the digital map data. In step 2260 a relevance of the events are determined. In step 2270 an incident list 2200 is generated and in step 2280 a short incident list 2000 is generated for display on the display device 240.

A summary of an exemplary device, and the software operating thereon, in accordance with an embodiment of the present invention will now be described. The main features of the device are as follows:

designed for aiding commuters; it is not a navigation device per se in that it does not provide turn-by-turn guidance instructions; aim to provide personal traffic and travel information when a favourite is selected AND near traffic when no destination input (i.e. free driving)

ETA and ETA delta to favourite destination using personal main and alternate routes predicting destination from one of your input favourites determining personal relevant traffic permanent active dock; click and go solution ecosystem: web portal and/or mobile app for maintaining, e.g. adding and deleting, favourites; viewing current traffic for your favourites; registration speed camera alerts and reporting 2.4" colour screen with 7 capacitive touch areas GPRS device for communicating with a server for LIVE services, e.g. traffic, speed cameras, weather, OTA software updates GPS device for determining device location small battery to support minimum requirements when not powered (e.g. GPRS operation, anti-theft use cases, and minimal time of operation)

on/off/reset hard button on the back of the device basic speaker, suitable for tones, not voices anti-theft features, e.g. remote lock and unlock from web portal, pin protection on the device (possibly only for first activation following undock and dock)

Favourites Database

The favourites database contains the location of one or more favourites, e.g. a POI such as home, work, station, school, family, restaurant, etc, up to a maximum number, together with an identifier such as a name, icon and/or and colour (all editable by the user). Each favourite will typically therefore be a point location. A favourite can be added to the database by the user selecting a location on a digital map, or based on a current location of the device.

Favourites can be added on device or using a web portal.

Each favourite may have an associated zone, e.g. a circle of radius 250m centred on the favourite's location. If a new favourite is added within the zone of an existing favourite, then the user is asked if the location of the existing favourite is to be changed.

When using the web portal, one or more (previously input) favourites can be selected, and a representation of the map sized to contain all selected favourites is shown, together with current traffic information superposed on the map. This allows the user to view the current traffic situation for travel between particular favourites before starting a journey.

The favourites database can be stored on the device, or on a remote server in association with an identifier of the device.

Trip Database

The trip database stores the routes travelled by the device/user in association with the time of travel. The trip database is essentially a personal (or learnt) network, which is a subset of the network represented by the digital map.

The routes are stored with respect to a digital map; the digital map comprising a plurality of segments representative of a network of navigable segments. Each route therefore comprises a plurality of segments, and wherein for each segment of the route there is stored the following data:
- a segment identifier
- time slot identifier (recording when travel along the segment occurred; time slots of 30 minutes across week time period are used in the preferred embodiment, i.e. 336 time slots, but larger or smaller time slots can be used as desired)
- a segment identifier of the previous segment (i.e. identifying the segment from which the device/user transitioned to the current segment)

The routes are therefore stored in such a way that, for example, the route from home to work in the morning is stored as a separate route from that of work to home in the evening.

The trip database also stores a count of the number of times a segment is traversed in a given time slot. This count is used to keep the trip database up to date (and given the limited memory capacity available), with older, less frequently used trips being replaced with newer routes as required. The trip database therefore always reflects the most recent travel behaviour of the device/user.

The end segment of each route in the trip database is associated with a favourite from the favourites database. As will be appreciated, a user may stop/park at several different locations around a particular favourite, and thus different end segments may be directed to the same favourite.

The trip database is created and stored on the device in preferred embodiments. It is envisaged, however, that the trip database could be created and stored on a server in association with an identifier of the device (or particular user of the device). In this latter embodiment, the device sends positional data to the server representative of its movement on the navigable network over time, e.g. time stamped lat-long coordinates received from the GPS device.

Relevant Traffic Algorithm

One function of the device is to provide the user with relevant, personal traffic information.

It is known to show all current traffic events in an area to user, the traffic events being superposed on a representation of a digital map. It is also known to inform driver's about "relevant" traffic on a previously calculated route, e.g. on a traffic bar.

Traffic information is received by the device, e.g. HDT feed over GPRS connection. The traffic information is received in relation to the base map, and not just the learnt network. Traffic information can include information on traffic jams/delays caused by accidents, road closures, road works, lane closures, etc.

Three groups of traffic events can be determined as being of relevance to the user, and which can be shown to the user in a Jam List. A portion of the Jam List is preferably shown in a Short Jam List displayed simultaneously with the driving view. Each traffic event in the Jam List is displayed with at least one of: a road name or number, the direction of the traffic event (N, S, E or W), an icon representing the type of the traffic event, the distance to the traffic event, and the delay caused by the traffic incident. In use, the entry for a traffic event may repeatedly switch between showing the distance to the event and the delay caused by the event.

Probable jams: These are traffic events present on the learnt network. The relevance of the identified traffic events is based on at least one of: distance to the traffic event, delay caused by traffic event (i.e. severity), tendency of traffic event (i.e. whether the delay caused by the event is increasing and/or decreasing), and predicted duration of the traffic event (i.e. a prediction of when the traffic event will end).

Relevant no-jams: The user may be informed about segments on the learnt network, typically major roads, e.g. motorways, highways, etc, that currently do not have any traffic events. Such "no-jams" messages are typically in relation to major roads that are in the vicinity of the current position.

Possible jams: These are traffic events that may impact the user's journey, but are not determined using the learnt network. Possible jams are determined if they are within a predetermined distance of the current device position (e.g. haversine distance <50 km), the jam direction is within a predetermined angle of the course of the device (e.g. +/−120°), and the jam is within a predetermined sector in front of the current device position (e.g. +/−120°).

Probable jams and relevant no-jams take precedent over possible jams in the displayed Jam List. Traffic events are displayed in the Jam list up to a predetermined maximum number. Traffic events in the Jam List are sorted using any criteria as desired, including: alphabetically based on road name and/or number, severity, distance from current position, etc.

Destination Prediction Algorithm

The prediction engine is used to predict the likely destination when a user begins a trip from the learnt network and the favourites database.

The prediction engine uses a current position, time-slot and the learnt network to predict at least a most probable favourite the user is heading toward. The predicted destination/favourite is shown to the user, and confirmation requested that it is correct. If the prediction engine fails to return a result, or the predicted destination/favourite is said to be incorrect by the user, then the user can select the intended destination/favourite or simply select "just drive".

The prediction engine can also return a most probable route to be travelled to the predicted destination; can occur even if the user selected just drive. The predicted route is used in the steps of the "route calculation" section discussed below.

Prediction engine uses a route search algorithm, such as A* or a variant thereof, to search the learnt network using cost values based on the relative number of times travelled on each segment leaving a node. For example, at a node in the learnt network having two possible paths at a decision point, a first path being travelled 20 times and a second path being travelled 10 times, the probability of taking the first path is ⅔ and the second path is ⅓.

Prediction has three components:

(i) The prediction engine takes the current device position and current time, and attempts to identify any segments of the learnt network that are within a 250 m range of the current position and have an associated time slot matching the time slot containing the current time or one of the adjacent time slots thereto. If any such segments are identified, then the prediction engine performs a route search on the learnt network starting from each of the identified segments to determine the most probable route (and accordingly the most probable destination).

(ii) If no segments are identified in step (i), then identify any segments that are within a 250 m range of the current position, regardless of time slot. Repeat the route search of the learnt network from each of the identified segments, but wherein the probabilities associated with potential paths from nodes are modified, typically reduced, based on the difference between the desired time slot and the time slot associated with the path.

(iii) If no segments are identified in step (iii), then look at the time slots associated with the segments having a favourite associated therewith, i.e. the "end" segments. Suggest the favourite with associated time slot that is the least different from the current time slot, assuming a "as the crow flies" route from the current position to the favourite at an average speed of 60 kph.

Steps (i) and (ii) provide a likely destination/favourite and route; whilst step (iii) only provides a likely destination.

As will be appreciated, the accuracy of the prediction engine improves with: the position and time slot being in the learnt network; a regular user travel behaviour, e.g. "commuting" behaviour; and a higher density of data in the learnt network.

Generating the Schematic Road

The driving view uses a schematic representation of the digital map to provide information to the user, including: traffic events and attributes thereof, speed camera locations, destination locations, ETA labels and ETA delta labels. ETA and ETA delta labels are discussed in more detail below.

Traffic information in respect of traffic events either on the current road and/or exits therefrom are depicted as a layer displayed on the schematic representation. Users are therefore informed about nearby traffic events, both on and off the learnt network. The traffic layer is preferably used to inform the user of the distance to the beginning and/or end of a jam and the delay associated with the jam.

The schematic representation shows the road topology of the road ahead, e.g. road exits from the current road, bends in the current road, and dead ends in the current road, up to a predetermined range ahead of the current position. A first predetermined range, e.g. 800 m, can be used if the user is travelling on a main road, and a second predetermined range, e.g. 400 m, can be used if the user is travelling on a minor road. Preferably, different colour schemes are used to indicate the portions of the schematic road that are on the learnt network, and those that are only present in the base map.

The "schematic road" shows the road currently being traversed as a line projecting from the base of the display window to the top of the display window, the base representing the current device location and the top representing the predetermined range. Shown along this line, projecting to the left or right as appropriate, are exits from the road currently being traversed and bends in the current road greater than 45°.

The "schematic road" is generated from a simplified map data structure, which is created at run-time based on the topology and geometry of the navigable network present in the digital map.

Creating the Simplified Map Data Structure

Each segment of the digital map has a start node and an end node; at least one of the nodes being connected to at least other segment in the digital map. An example of a node connecting only two segments is when the same road is split into two segments because some of the attributes of the road, e.g. name, speed limit, etc, changes in that node position. An example of a node connecting a segment with multiple outgoing segments is typically a road with one or more exits in that node position.

At least some of the segments also have associated data indicating the geometry of the segment; this could be mathematical representation of the geometry such as a clothoid, or the segment could comprise one or more intermediate nodes can be used to indicate changes in the geometry of the road. The latter is the more common approach, and the one described below.

The aim of the simplified map data structure is essentially to identify the road features ahead of the vehicle as either "left", "right" or "straight ahead" based on a comparison between the current course (whilst traversing a current segment) and the course of the segments ahead of the vehicle. In embodiments, this is done by considering the angle between a master reference line for a segment and one or reference lines for the segment. The "master reference line" is the straight line connecting the current position and the next node (or intermediate node). A "reference line" is a straight line between a node (or intermediate node) and the next node (or another intermediate node).

Exits are positioned along the "schematic road" at positions corresponding to their position in the map based on the chosen scale for the schematic road. The scale is typically not linear, but varies according to a predefined function.

The schematic road is continually updated as the vehicle progresses along the road, with the schematic road rotating to the left or the right about a suitable pivot point when a driver takes an exit to the left/right or follows a bend to the left/right.

Route Calculation

A minimum cost route, typically a fastest route, is calculated to the destination using the base map, but wherein the cost values associated with traversal along segments is modified using the learnt network. In particular, the cost values of the base map are modified such that the routing algorithm favours the segments that form the predicted route from the prediction engine (if one is available) and any segments that are in the learnt network. Segments of a predicted route are favoured above those that are on the learnt network.

The routing algorithm is designed to take account of current traffic conditions; in preferred embodiments received traffic information reducing a time-dependent average speed for the road segment.

As will be appreciated, due to these modifications in the segments costs of the base map, the calculated route should be the fastest route to the destination (given current traffic) on the user's favoured routes; although it may not always be the overall fastest route to the destination.

In some embodiments, if the fastest route determined using the base map as modified by the learnt network is substantially slower than that on the base map alone, e.g. 50% slower or any threshold level as desired, then route may be recalculated to simply reflect the fastest route on the base map.

Although the invention has been described in relation to time, i.e. fastest routes, etc; the same invention can be applied to other costs, e.g. most economical, etc.

On the driving view, the user is shown an ETA label on the primary, i.e. fastest, route, together with a maximum of two ETA delta labels for alternate routes are displayed.

In order to determine the ETA and ETA delta labels:

1. The user first selects a destination; this can be confirmation of a destination from the prediction engine or simply a user selection from the stored locations in the favourites database.

2. Determine primary route from the current location to the selected destination; use traffic information if available, or recalculate once traffic information received.

3. Calculate ETA, and display ETA label for the primary route on the driving view.

4. As user travels, at each decision point of the learnt network, i.e. at each point where there are multiple paths from the same segment to reach the same favourite/destination, an alternate route is calculated using the less favoured path (on the modified base map) and an ETA delta determined.

5. Traffic updates are continually received, and the primary and alternate paths continually monitored and recalculated based on received traffic information. Due to traffic, an alternate path may become the primary path, i.e. have a quicker ETA, and thus the ETA label is then applied to the "new" primary path and the ETA delta label applied to the "new" alternate path.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A mobile device, comprising a processor communicably coupled to a trip database storing information indicative of a personal road network of roads previously traveled by a user of the mobile device, one or more road segments in the personal road network being associated with a respective destination location, wherein the processor performs operations for a prediction module that:

selects a given road segment from the personal network based on a current location of the mobile device;

executes a route search algorithm to generate a route based on costs associated with road segments, the route search starting from the given road segment from the personal network, wherein the cost for each road segment is computed based on attributes associated with traversing the road segment, and wherein the cost for each road segment is reduced when the road segment is included in the personal road network;

determines a destination of a user of a mobile device based on the route; and provides the destination to the user for selection as a destination of a current journey.

2. The mobile device of claim 1, wherein the traversal information is indicative of a number of times each road segment in the personal network has been traversed by the user.

3. The mobile device of claim 1, wherein the road segment selected as the start location has a location corresponding to, or within a predetermined distance of, the current location.

4. The mobile device of claim 1, wherein the prediction module determines the destination based on a current time and time information stored in the trip database indicative of a time of traversal of associated road segments in the personal network.

5. The mobile device of claim 4, wherein the prediction module selects a road segment from the personal network based on the current location of the mobile device and performs the route search using the road segment as a start location when the current time corresponds to the time information.

6. The mobile device of claim 5, wherein the time information indicates one of a plurality of periods of time during which the road segment was traversed, and the current time corresponds to the time information when matching, or within a predetermined number of time periods of, the current time.

7. The mobile device of claim 1, wherein the processor is communicably coupled to a favourites database storing information indicative of one or more points of interest (POIs) selected by the user.

8. The mobile device of claim 7, wherein the one or more road segments in the personal network associated with a destination location are associated with POIs in the favourites database.

9. The mobile device of claim 1, wherein the personal network of the user comprises a plurality of road segments previously traversed by the user of the mobile device in one or more journeys.

10. The mobile device of claim 1, comprising a display device, wherein the prediction module provides a suggested destination interface comprising the determined destination.

11. The mobile device of claim 1, wherein the prediction module provides one or more further, less likely, destinations.

12. A method of determining a destination of a user of a mobile device, the mobile device being coupled to a trip database storing information indicative of a personal road network of roads previously traveled by a user of the mobile device, one or more road segments in the personal road network being associated with a respective destination location, the method comprising:

selecting a given road segment from the personal network based on a current location of the mobile device;

executing a route search algorithm to generate a route based on costs associated with road segments, the route search starting from the given road segment from the personal network, wherein the cost for each road segment is computed based on attributes associated with traversing the road segment, and wherein the cost for each road segment is reduced when the road segment is included in the personal road network;

determining the destination based on the route; and providing the destination to the user for selection as a destination of a current journey.

13. The method of claim 12, wherein the destination is a destination location associated with a road segment found by the route search algorithm.

14. The method of claim 12, wherein the determining of the destination based on a current time and time information stored in the trip database indicative of a time of traversal of associated road segments in the personal network.

15. The method of claim 12, wherein the one or more road segments in the personal network associated with a destination location are associated with user-selected points of interest (POIs) stored in a favourites database.

16. The method of claim 12, comprising providing the determined destination to the user for selection as a destination of a current journey.

17. A non-transitory computer readable medium comprising computer software operable, when executed, to cause one or more processors coupled to a trip database storing information indicative of a personal road network of roads previously traveled by a user of a mobile device, one or more road segments in the personal road network being associated with a respective destination location, to perform a method of determining a destination of a user of the mobile device, the method comprising:

selecting a given road segment from the personal network based on a current location of the mobile device;

executing a route search algorithm to generate a route based on costs associated with road segments, the route search starting from the given road segment from the personal network, wherein the cost for each road segment is computed based on attributes associated with traversing the road segment, and wherein the cost for each road segment is reduced when the road segment is included in the personal road network;

determining the destination based on the route; and providing the destination to the user for selection as a destination of a current journey.

* * * * *

UNITED STATES PATENT AND TRADEMARK OFFICE
CERTIFICATE OF CORRECTION

Page 1 of 1

PATENT NO. : 9,869,563 B2
APPLICATION NO. : 14/785406
DATED : January 16, 2018
INVENTOR(S) : Samuel Mark Broadbent et al.

It is certified that error appears in the above-identified patent and that said Letters Patent is hereby corrected as shown below:

On the Title Page

The Assignee should be listed as TomTom Navigation B.V.

Signed and Sealed this
Eleventh Day of September, 2018

Andrei Iancu
*Director of the United States Patent and Trademark Office*